United States Patent [19]

Juszczak et al.

[11] Patent Number: 5,657,223
[45] Date of Patent: Aug. 12, 1997

[54] METHOD FOR SEISMIC DATA PROCESSING USING DEPTH SLICE DECOMPOSITION

[75] Inventors: James W. Juszczak, Bellaire; Dennis E. Willen, Houston, both of Tex.

[73] Assignee: Exxon Production Research Company, Houston, Tex.

[21] Appl. No.: 439,834

[22] Filed: May 12, 1995

Related U.S. Application Data

[63] Continuation-in-part of Ser. No. 254,020, Jun. 3, 1994.

[51] Int. Cl.$^6$ .................................................. G06F 17/12
[52] U.S. Cl. ................................... 364/421; 364/422
[58] Field of Search ................................ 364/421, 422

[56] References Cited

U.S. PATENT DOCUMENTS

| | | | |
|---|---|---|---|
| 5,198,979 | 3/1993 | Moorhead et al. | 364/421 |
| 5,394,325 | 2/1995 | Schneider | 364/421 |
| 5,504,678 | 4/1996 | Juszczak et al. | 364/421 |

FOREIGN PATENT DOCUMENTS

WO9313434  12/1992  WIPO ................ G01V 1/28

OTHER PUBLICATIONS

Baker, L.J.; "Is 3-D Wave-Equation Modeling Feasible in the Next Ten Years?"; *Supercomputers in Seismic Exploration*, Handbook of Geophysical Exploration, edited by E. Eisner, Section I, Seismic Exploration, V. 21, p.1-10, Pergamon Press, Oxford. (no date).
Bogdanov, A.A., Kreisberg, V.M., Kozlov, E.A., and Medvedev, I.L.; "Pre-stack Kirchhoff Depth Migration on the Parallel Execution Environments"; 55th European Association of Exploration Geophysicists Meeting; Stavanger, Norway; Jun. 7, 1993.
Cabrera, J.J., Perkins, W.T., Ratcliff, W.T., and Lynn, Walter; "3D Prestack Depth Migration on a Massively Parallel Computer: Implementation and Case History"; European Association of Exploration Geophysicists 54th Meeting and Technical Exhibition; Paris, France; Jun. 1, 1992.
Caliga, David; "Issues for Seismic Data Movement in a Heterogeneous Scalar-vector-parallel Computing Environment"; Conference of Australian Society of Exploration Geophysics; Gold Coast, Australia; Oct. 5, 1992.
Charrette, E.E.; "2D Prestack Kirchhoff Depth Migration on a MIMD Parallel Computer"; paper presented at the 24th Annual OTC; Houston, Texas; May 4, 1992.

(List continued on next page.)

*Primary Examiner*—Ellis B. Ramirez
*Assistant Examiner*—Demetra R. Smith
*Attorney, Agent, or Firm*—S. P. Koch; F. E. Reid

[57] ABSTRACT

A method of processing geophysical data on a parallel processor. The method involves decomposition of an analysis cube into depth slices, a second decomposition of a data acquisition cube into traveltime slices, and determination of a variably dimensioned analysis aperture. Precomputed traveltimes are stored in packed format to minimize storage volume and data bandwidths. The method relies on staged access of traveltime fields from high speed mass storage to disk storage and via input/output processors to analysis processor memory. The input/output processors monitor analysis processor memory to optimize the direct scatter download of traveltime fields to the analysis processors. The seismic trace data download is also staged, preferably from tape storage to disk storage to processor memory. A control processor preprocesses the trace data while downloading the trace data from disk storage to processor memory. The control processor monitors analysis processor memory to optimize the trace data download, which involves a logarithmic tree broadcast technique. The method allows multiple common offsets to be simultaneously processed, and can be carried out on any type of parallel processing computer.

11 Claims, 14 Drawing Sheets

OTHER PUBLICATIONS

Kao, J.C.; "A Practical Implementation of the Multi-processing 3D Kirchhoff Prestack Migration Scheme on the Cray Y–MP Systems"; European Association of Exploration Geophysicists 54th Meeting; Paris, France; Jun. 1, 1992.

Kao, J.C.; "Multitasked Computation of the 3–D Prestack Kirchhoff Time Migration on the Cray Y–MP C90"; 62nd Annual Society of Exploration Geophysics International Meeting; New Orleans, LA; Oct. 25, 1992.

Kao, J. C. and Li, G. and Yang, C; "Cray T3D MPP Implementation of Solving The Pentadiagonal Systems in the 3D Depth Migration"; 55th European Association of Exploration Geophysicists Meeting; Stavanger, Norway; Jun. 7, 1993.

Kao, J. C. and Li, G. and Yang, C; "Preconditioned Iterative 3–D Finite–Difference Depth Migration or Modeling on the Cray T3D Massively Parallel Processors"; 63rd Annual Society of Exploration Geophysicists International Meeting; Washington, DC; Sep. 26, 1993.

Kao, J. C. and Stoffa, P.L.; "Parallel Implementation of Poststack 3–D Split–step Depth Migration on the Cray Y–MP C90"; 62nd Annual Society of Exploration Geophysicists International Meeting; New Orleans, LA; Oct. 25, 1992.

Liu, L.L.; "3–D Prestack Kirchhoff Migration: Parallel Computation on Workstations"; Society of Exploration Geophysicists 63rd Annual Meeting; Washington, DC; Sep. 26, 1993.

Lumley, D.E. and Biondi, B.; "Kirchhoff 3D Prestack Time Migration on a Massively Parallel Supercomputer"; European Association of Exploration Geophysicists 54th Meeting and Technical Exhibition; Paris, France; Jun. 1, 1992.

Lynn, W.S., Perkins, W., Cabrera, J., and French, W.S.; "3–D Prestack Imaging on Massively Parallel Computers"; paper presented at the 24th Annual OTC; Houston, Texas; May 4, 1992.

Moorhead, W.D.; "Hypercube Supercomputing"; *Supercomputers in Seismic Exploration*, Handbook of Geophysical Exploration, edited by E. Eisner, Section I, Seismic Exploration, V. 21, pp.159–183, Pergamon Press, Oxford. (no date).

Wenes, G.; Cray T3D Performance Evaluation; MPP Advisory Group Presentation; Eagan, Minn,; Nov. 16, 1992.

Wenes, G.; "Seismic Imaging in Massively Parallel Processors (MPP) Computer Architectures"; 55th European Association of Exploration Geophysicists Meeting; Stavanger, Norway; Jun. 7, 1993.

Wenes, G.; Untitled Poster Paper; Conference of European Association of Exploration Geophysicists; Stavanger, Norway Jun. 7, 1993.

Wenes, G., Shiu, J., and Kremer, S.; "Seismic Imaging in a Production Environment"; Talk presented at the Cray User Group (CUG) Meeting; San Diego, CA; Mar. 14, 1994.

5,657,223

METHOD FOR SEISMIC DATA PROCESSING USING DEPTH SLICE DECOMPOSITION

RELATED APPLICATION

This application is a continuation-in-part of co-pending application Ser. No. 08/254,020 filed Jun. 3, 1994.

FIELD OF THE INVENTION

This invention relates to the field of geophysical prospecting. Specifically, the invention involves a method of processing seismic data using parallel processors.

BACKGROUND OF THE INVENTION

The search for subsurface hydrocarbon deposits typically involves a multifaceted sequence of data acquisition, analysis, and interpretation procedures. The data acquisition phase involves use of an energy source to generate signals which propagate into the earth and reflect from various subsurface geologic structures. The reflected signals are recorded by a multitude of receivers on or near the surface of the earth, or in an overlying body of water. The received signals, which are often referred to as seismic traces, consist of amplitudes of acoustic energy which vary as a function of time, receiver position, and source position and, most importantly, vary as a function of the physical properties of the structures from which the signals reflect. The data analyst uses these traces along with a geophysical model to develop an image of the subsurface geologic structures.

The analysis phase involves procedures which vary depending on the nature of the geological structure being investigated, and on the characteristics of the dataset itself. In general, however, the purpose of a typical seismic data processing effort is to produce an image of the geologic structure from the recorded data. That image is developed using theoretical and empirical models of the manner in which the signals are transmitted into the earth, attenuated by the subsurface strata, and reflected from the geologic structures. The quality of the final product of the data processing sequence is heavily dependent on the accuracy of these analysis procedures.

The final phase is the interpretation of the analytic results. Specifically, the interpreter's task is to assess the extent to which subsurface hydrocarbon deposits are present, thereby aiding such decisions as whether additional exploratory drilling is warranted or what an optimum hydrocarbon recovery scenario may be. In that assessment, the interpretation of the image involves a variety of different efforts. For example, the interpreter often studies the imaged results to obtain an understanding of the regional subsurface geology. This may involve marking main structural features, such as faults, synclines and anticlines. Thereafter, a preliminary contouring of horizons may be performed. A subsequent step of continuously tracking horizons across the various vertical sections, with correlations of the interpreted faults, may also occur. As is clearly understood in the art, the quality and accuracy of the results of the data analysis step of the seismic sequence has a significant impact on the accuracy and usefulness of the results of this interpretation phase.

In principle, the seismic image can be developed using a three-dimensional geophysical model of seismic wave propagation, thereby facilitating accurate depth and azimuthal scaling of all reflections in the data. Accurately specified reflections greatly simplify data interpretation, since the interpretational focus can be on the nature of the geologic structure involved and not on the accuracy of the image. Unfortunately, three dimensional geophysical models frequently require intolerably long computation times, and seismic analysts are forced to simplify the data processing effort as much as possible to reduce the burdens of both analysis time and cost.

In addition to the three dimensional computation challenge, the analyst faces a processing volume challenge. For example, a typical data acquisition exercise may involve hundreds to hundreds of thousands of source locations, with each source location having hundreds of receiver locations. Because each source-receiver pair may make a valuable contribution to the desired output image, the data handling load (i.e. the input/output data transfer demand) can be a burden in itself, independent of the computation burden.

Seismic data analysts have historically used several different approaches to directly or indirectly manage these burdens. These approaches relate principally to either the manner in which the data acquisition exercise is designed and carried out, or to the assumptions made during the data analysis effort. In both cases, the quality of the output of the data interpretation procedure may be directly affected. These approaches are most easily discussed in conjunction with FIG. 1, which depicts a perspective view of a region 20 of the earth for which a geophysical image is desired. On surface 18 of the earth are shown a number of shot lines 2 along which the seismic data are acquired. As shown in FIG. 1A, shot lines 2 consist of a sequence of positions at which a seismic source 3 is placed and from which seismic signals 5 are transmitted into the earth. Receivers 4 placed along each line receive the signals from each source position after reflection from various subsurface reflectors 6.

In FIG. 1, region 20 is a three-dimensional volume of the earth. It is not necessary that region 20 have any particular shape (e.g., a cube or a parallelepiped). However, for ease of reference, all such three-dimensional volumes will be hereinafter referred to as "cubic."

A first method of managing the seismic data burdens discussed above involves careful definition of the region over which the data acquisition exercise is carried out. Specifically, use of any available preliminary geologic and geophysical information may facilitate the minimization of the surface area over which seismic data may need to be acquired. Such a minimization will directly reduce the amount of data that is ultimately acquired. Furthermore, similarly careful planning of the spacing between shot lines will optimize the analysis effort by reducing data volume. And finally, optimization of the number of sources and receivers which are used, and of the spacing between adjacent source and receiver positions, will also benefit the data analyst.

None of these efforts can be accomplished without a penalty however. For example, relatively wide spacings between shot lines, or between sources and receivers, reduce the resolution of the computed seismic image, thus making interpretation more difficult. In addition, complex geologic features may not be resolvable without relatively close spacings. And finally, certain data acquisition exercises, such as in relatively unexplored areas, do not allow optimization of the surface area over which data is to be acquired. As a result, the data handling burden cannot be entirely eliminated through data acquisition planning.

Methods of minimizing the computational burden are often implemented during data analysis. One commonly invoked technique involves use of a two-dimensional geophysical model. For example, in FIG. 1A, the signals for each source is depicted as traveling in the plane directly beneath the shotline on which the source lies. Thus, the signal is assumed to propagate independent of out-of-plane geologic structures. This simplifying assumption allows use of two dimensional geophysical models in the image generation process, and, as is well known, two dimensional analysis procedures can be much more computationally efficient than three dimensional analysis procedures.

Limitations to the two dimensional analysis assumption exist however. Geologic structures are rarely, if ever, two dimensional; that assumption may therefore lead to inaccurately specified images. Because little is generally known of the geologic structure being investigated, the analyst usually does not know the extent to which that image is in error. In addition, because each plane is analyzed independently, the interpreter must tie the images for each plane to each other by interpolation or other similar interpretative methods if a continuous image across the entire cubic region is desired. And finally, some complex structures, such as faulted regions and salt features, cannot be accurately analyzed merely by use of two dimensional methods.

Because of these and other limits which have long constrained seismic data analysts, the petroleum industry has typically been an early user of newly developed high speed computer hardware. As each new generation of equipment has become available, analysis routines which implement fully three dimensional analysis capabilities have become more commonly used. Nevertheless, it is not uncommon for significant computer times to be involved in complex analyses, often involving weeks or months of actual processing time.

The recent availability of massively parallel processors offers a significant opportunity to seismic data analysts. Massively parallel processors (MPPs) have multiple central processing units (CPUs) which can perform simultaneous computations. By efficient use of these CPUs, the weeks or months previously required for complex analyses can be reduced to a few days, or perhaps a few hours. However, this significant advantage can only be realized if efficient computational algorithms are encoded in the MPP software. Thus, the opportunity MPPs offer seismic data analysts also creates a challenge for the development of suitable computational algorithms which take advantage of the multiple CPUs.

This challenge can be easily discussed by considering the manner in which computational algorithms have most commonly been written for existing seismic analysis routines. Until recently, computers relied on a mode of operation referred to as sequential computing. Sequential computing involves use of analytic routines which perform only a single procedure, or perhaps focus on a single subset of the data or image, at any given time. This is a direct result of a computer having only one CPU. For that reason, the only optimization procedures which can be employed on single CPU computers are those which increase the efficiency of the processing as to the procedure or subset. Because all calculations must ultimately be performed by that single CPU, however, the options for obtaining high performance are innately limited.

On the other hand, the multiple CPU capability of MPPs offers an obvious simultaneous computation advantage. This advantage is that the total time required to solve a computational problem can be reduced by subdividing the work to be done among the various CPUs, provided that the subdivision allows each CPU to perform useful work while the other CPUs are also performing work. Unfortunately, the disadvantage of multiple CPU hardware is that the sequential processing methods which have long been used in software development must be replaced by more appropriate parallelized computing methods. Simply stated, MPPs require that processing methods be developed which make efficient use of the multiple CPU hardware. Ideally, these methods should organize the distribution of work relatively evenly among the processors, and ensure all processors are performing necessary computations all of the time, rather than awaiting intermediate results from other processors.

The challenge of defining parallelized processing methods, and of optimizing those parallelized methods once defined, is particularly acute in the seismic data processing arena. Seismic data consists generally of a large number of individual traces, each recorded somewhat independent of the other traces. Logically enough, sequential computing methods which require the analytic focus to be placed on a single calculation at a time adapt well to analysis of these independent traces. This is true even though computational bottlenecks may exist. For example, portions of the analytic sequence may require relatively more computation time than other portions, must be completed before other calculations may proceed, or may rely on similar input data as other traces, for example traveltimes. Since no simultaneous computations occur in sequential processing, none of these bottlenecks lead to a reduction in computational efficiency with a single CPU, except as to the total processing time which is required. And except as to that total time requirement, the existence of such computational bottlenecks does not otherwise pose problems for the analyst. To take full advantage of MPP computing capabilities, however, where the goal is to perform simultaneous processing in all CPUs, methods for optimizing the seismic analysis phase by eliminating such bottlenecks must be developed.

This advantage of an MPP becomes clear by considering the limitation which calculation time places on image region size in single CPU computers. As the size of the image increases, for example by expanding the size of cube 20 in FIG. 1, or the amount of data to be processed increases, for example by adding additional sources 3 and receivers 4 to shotlines 2, the total computation time is directly lengthened by the number of additional individual calculations. That direct impact on calculation time places a heavy burden on seismic analysts to optimize image size, especially since even small image regions may require weeks of computation time on even the highest speed sequential processing computers. In contrast, efficient processing on MPPs, which may have as many as or more than 256 individual CPUs, should only involve minimally lengthened computation times, since each CPU would assume just a fraction, for example 1/256, of the additional work required by the larger region. This potential for scalability of the image region and the work load required in image generation is a principal benefit of MPPs, a benefit which can only be realized if parallelized seismic processing methods allowing such workload scalability are developed.

Basic considerations for determining efficient parallelized seismic processing methods become evident by reconsidering the above review of the seismic analysis process. As noted, the purpose of seismic analysis is to analyze measured seismic data using geophysical models to develop images of the subsurface. Therefore, each of three principal processing components—data, model, and image—may be considered to be candidates for distributing computational work among the various processors in an MPP. One option for distributing work among the processors would be to assign different groups of the input seismic trace data to different processors. For example, traces may be grouped by source locations, with different processors being assigned different groups. Similarly, the output image could be subdivided and assigned to different processors. In this case, the groupings and processor assignments would be, for example, as to different surface positions in the output image or depth locations of reflectors of interest. Finally, it may also be possible to subdivide the geophysical model used to generate the output image into groupings which can be assigned to the various processors (That model is generally considered to be embodied in the arithmetic operations required by the mathematical model which is the subject of the processing effort. For example, in seismic analysis the mathematical model is often based on the wave equation). For example, the data may be transformed into the frequency domain, with individual frequencies assigned to individual processors. It may also be possible to develop combinations of these approaches. For example, groups of processors may be assigned collective responsibility for specific frequencies in the model and all depths in the image, while having individual responsibility for specific horizontal locations in the image. The challenge to the seismic data analyst is to determine methods of subdividing the seismic data, model, and image into components which can be assigned to individual processors in the MPP, thus allowing calculations to be performed in each processor independently of other processors. This subdivision of seismic data analysis into individual components is commonly referred to as seismic decomposition.

Efficient use of an MPP requires more than mere subdividing of the seismic data, model and image components however. A number of additional considerations must be taken into account if the resulting parallel processing method is to efficiently use all CPUs in an MPP. These additional considerations relate specifically to the unique calculations involved in seismic analysis. For example, as demonstrated in FIG. 1A, a seismic dataset consists of a large number of seismic signals 5, with each signal being associated with a specific source and receiver pair. As is well known in the art, the sequence of received signals at each receiver represents the time history of reflections from a possibly large number of subsurface reflectors. Processing of all portions of all traces for development of any specific portion of the output image may not be time or cost effective, however, since all traces will not in general contribute to all portions of the image. As a result, seismic analysts generally specify a fixed region surrounding the portion of the image being computed. Only the traces within that region, referred to as the aperture, are used to compute the image. To ensure that all important data is retained for the image computation, the aperture is usually conservatively specified to have relatively wide dimensions and is invariant with depth within the imaging region and with source-receiver offset.

Unfortunately, this conservative approach leads to inefficient use of computer resources. For example, the propagation path for a given source-receiver pair and a specific reflector may be such that the received signal occurs at a late arrival time. Alternatively, the slope of the reflector may be such that the signal-to-noise ratio of the received signal is insufficient to contribute to the generation of the portion of the image of principal interest. Finally, computation of an image from some combinations of all available data traces may lead to a well known imaging problem referred to as aliasing. For these reasons, an efficient method of processing seismic data on an MPP should include a technique for determining the seismic aperture, such that those traces which are not useful to the image can be discarded before significant processor effort has been expended. Ideally, the MPP processing aperture should at least be a function of depth and source-receiver offset.

An additional consideration in seismic analysis relates to computation and storage of traveltime or velocity fields, one or the other of which is a required input to the geophysical model which is used to compute an image from the data. In general, seismic analysis routines calculate these fields for the entire region from which data was acquired, without a determination as to whether the data corresponding to specific portions of the fields will affect the image. Furthermore, because large computer memory resources would be required to retain the calculated fields, seismic analysts frequently recompute the fields several times on an as needed basis during the image generation process. Although this procedure minimizes memory usage, the penalty is a slowing down of the image generation process due to the frequent recomputations. As a result of that penalty, seismic analysts often minimize the size of the region to be imaged, so as to minimize field recomputation needs during imaging. For these reasons, an efficient method of processing seismic data on an MPP should minimize the memory storage requirements of the traveltime or velocity fields, while also allowing efficient recomputations of the necessary values by each CPU only as and when required.

Prior art methods of processing seismic data are also limited as to simultaneous computation abilities. Specifically, analysts generally prefer to sort the seismic data prior to processing, for example, into common offsets. Thereafter, the processing procedures are carried out. Because it is preferable to perform all processing for each common offset separately from the processing of subsequent offsets, prior art methods focus on a single common offset at a time, and perform all necessary data input, storage, calculations, and recalculations as to that offset prior to initiating subsequent offset calculations. However, this approach is an inefficient use of computer resources, because such input data as traveltimes are thereby required to be re-input for each offset. For that reason, a method or processing seismic data allowing simultaneous processing of multiple common offsets (i.e. two to four minimum) is desired. Such a method would reduce overall processing time and cost by reducing repetitive input/output (I/O) demand, and thereby increasing analysis efficiency.

Another constraint on the design of efficient parallelized methods of processing seismic data relates to the manner and frequency with which communication between CPUs and from CPUs to peripheral devices, such as disks and tape drives, is carried out. Although the goal is to have the multiple CPUs operating simultaneously, it is clear that except in a few unusual cases some amount of data sharing or computation synchronization may be necessary. Regardless of the method by which the seismic data, model or image are subdivided and assigned to individual CPUs, if the subdivision and assignment method requires a high level of communication among the MPP system's components, whether CPUs or peripheral devices, the MPP's performance will be limited. Therefore, an efficient method of processing seismic data on a parallel processor should maximize the computations that can be performed with a minimum amount of intercomponent communication. And to the extent that some intercomponent communication will always be required, again except in a few unusual cases, an efficient method of processing seismic data on an MPP will ensure that individual components are not forced to spend a significant amount of time waiting on delivery of the data or the instructions required for the next computation to be carried out.

From the foregoing, it can be seen that an improved method of processing seismic data on parallel processors is required. Preferably, the method should allow the computations in the seismic analysis phase to be decomposed into components which can be assigned to the individual processors in the MPP, with the seismic data contributing to the processing objective of each component relatively independently from the other components. The decomposition method and processor assignment scheme should be easily scaleable to datasets of varying size, and should optionally allow the computational workload to be balanced among all processors, if such a balance is desired. The method should include the capability to vary the size of the analysis aperture, and provide for minimized traveltime and velocity field recomputation and storage requirements. Finally, the method should involve a relatively balanced input/output data transfer requirement for each component, with such transfers substantially independent of transfers involving other components. The present invention satisfies these needs.

SUMMARY OF THE INVENTION

The present invention is a method of processing seismic data on parallel processors, preferably on a massively parallel processor (MPP). The method provides for decomposition of the subsurface analysis cube associated with either a geophysical model or an output image into horizontal depth slices which are assigned to individual processors. Decomposition into horizontal slices allows for maximization of the number of processors which are assigned to analysis tasks, thus increasing overall throughput. A grid of analysis points on each slice specifies the locations at which results are computed. The traveltime fields required for processing of the seismic data are also decomposed into horizontal slices, with traveltime slices interspersed among or simultaneous with the depth slices. Each traveltime slice is assigned a grid of traveltime points. To reduce traveltime data storage requirements, both the traveltime slices and the traveltime grids can more coarsely subdivide the analysis cube than do the depth slices and the analysis points. Traveltimes required for each depth slice are interpolated from the two closest traveltime slices.

A variably-dimensioned aperture is used to minimize calculations involving seismic traces which do not affect the analysis results for individual analysis points. The dimensions of the aperture may be a function of analysis point location within the cube, both laterally and with depth, and also of offset. An initial computation of the total workload required for each depth slice may be used to balance the workload assigned to each processor. In a preferred embodiment, an equal number of depth slices may be assigned to each processor, thereby simplifying traveltime data input/output requirements.

Traveltime fields are precomputed in cube format for each traveltime reference location on the surface of the data acquisition cube, and, as required during processing, are transferred through a staged, also referred to as a tertiary, storage sequence from high speed mass storage to disk to processor memory. To optimize traveltime storage requirements, absolute traveltime values are stored for only one vertical wall of the traveltime cube associated with each traveltime reference location. Traveltimes for other locations in the cube are stored in packed format as incremental traveltimes referenced to those absolute values, thus reducing traveltime storage requirements by approximately fifty percent. Precomputation of traveltime values speeds the overall processing effort, and avoids the repetitive recomputation constraints of prior art techniques which would otherwise lead to a more restrictively-sized analysis cube. During processing, older traveltimes are replaced in memory by newly required traveltimes using a least recently used replacement algorithm which also speeds processing. Processors dedicated to traveltime data input/output tasks ensure timely availability of the traveltime data.

The method provides for analysis of seismic data using a sorted order of clustered seismic trace data. The sorted order sequence is optimized by use of a simulation which uses analysis point coordinates extracted from the seismic source and receiver trace data. The simulation allows computation of traveltime data access statistics for the sorted order, and for resorting if desired, thereby providing a method of updating the sorted order to satisfy prespecified optimization objectives. The result of the simulation is the sequence in which trace data are transmitted to the MPP, which occurs through a second staged mass storage sequence of tape to disk to processor memory. This attribute of the present invention allows for I/O demands to be minimized by ensuring that seismic trace data are transmitted to the analysis processors when the corresponding traveltime data are also available. By eliminating inefficient repetitive transfers of trace data from tape and disk storage, overall throughput is maximized.

During analysis, groups of seismic traces are transmitted to all analysis processors. Each processor determines whether the traces affect the aperture for each analysis point on the depth slice assigned to that processor, and computes the corresponding analysis result if within the aperture. This attribute of limiting calculation to only those traces which have an impact on the analysis result minimizes both the time and cost of seismic processing. The ability to specify the aperture as a function of depth and offset is an improvement over the prior art.

The method can be used to compute seismic data processing analysis results wherever horizontal planes in an image or a model can be independently assigned to individual processors or groups of processors. Examples in which an image can be subdivided into horizontal planes include prestack Kirchhoff time and depth migration. Kirchhoff techniques do not require direct interaction among depth slices in the image, allow traveltimes to be partitioned into depth slices, and involve input data which contribute independently to the image for each slice. Examples for which a model can be horizontally subdivided include finite difference wave equation modeling and reverse-time migration by finite differences, since such modeling requires minimal exchange of data between adjacent depth slices.

BRIEF DESCRIPTION OF THE DRAWINGS AND TABLES

The present invention and its advantages will be more easily understood by reference to the following detailed description and the attached drawings and tables in which:

FIGS. 1 and 1A schematically illustrate the data acquisition configuration typically used in two dimensional seismic exploration;

Table 1 depicts a typical example of the assignment of depth and traveltime slices to individual processors in the present method.

While the invention will be described in connection with its preferred embodiments, it will be understood that the invention is not limited thereto. On the contrary, it is intended to cover all alternatives, modifications, and equivalents that may be included within the spirit and scope of the invention, as defined by the appended claims.

DETAILED DESCRIPTION OF THE INVENTION

The present invention is a method of processing seismic data on a parallel processor. The method may be employed on any type of parallel processing computer which has more than one processor available to perform analysis and/or input/output tasks. For example, a Cray Y-MP, which has eight processors may be employed. Networked personal computers or workstations may also be employed. In a preferred embodiment, the method will be employed on a massively parallel processor (MPP) having 64 or more processing elements. One example of such an MPP is the Cray Research, Inc. T3D. For convenience, and not to be construed as limiting, the abbreviation MPP will be used herein to refer to any parallel processing computer suitable for the present method. However, use of MPP in that manner is in no way to be construed as limiting application of the present method to solely those computers deemed by the commercial marketplace to be massively parallel.

The method subdivides the seismic data processing effort into two substantially independently performed phases. This subdivision is for convenience and is not a limitation of the method. In the first phase, depicted in block diagram form in FIGS. 5, 6, and 7, setup procedures are performed which provide for decomposition of an analysis cube, as defined herein, into substantially horizontal slices which can be independently assigned to individual processors of the MPP. This decomposition minimizes both the demand for traveltime data and the manipulation of those portions of the seismic data which will not contribute to the final output of the seismic data processing procedure. This phase of the method also optimizes the transfer of data between data storage hardware and the MPP, thus reducing overall processing time and cost.

Figure 8:
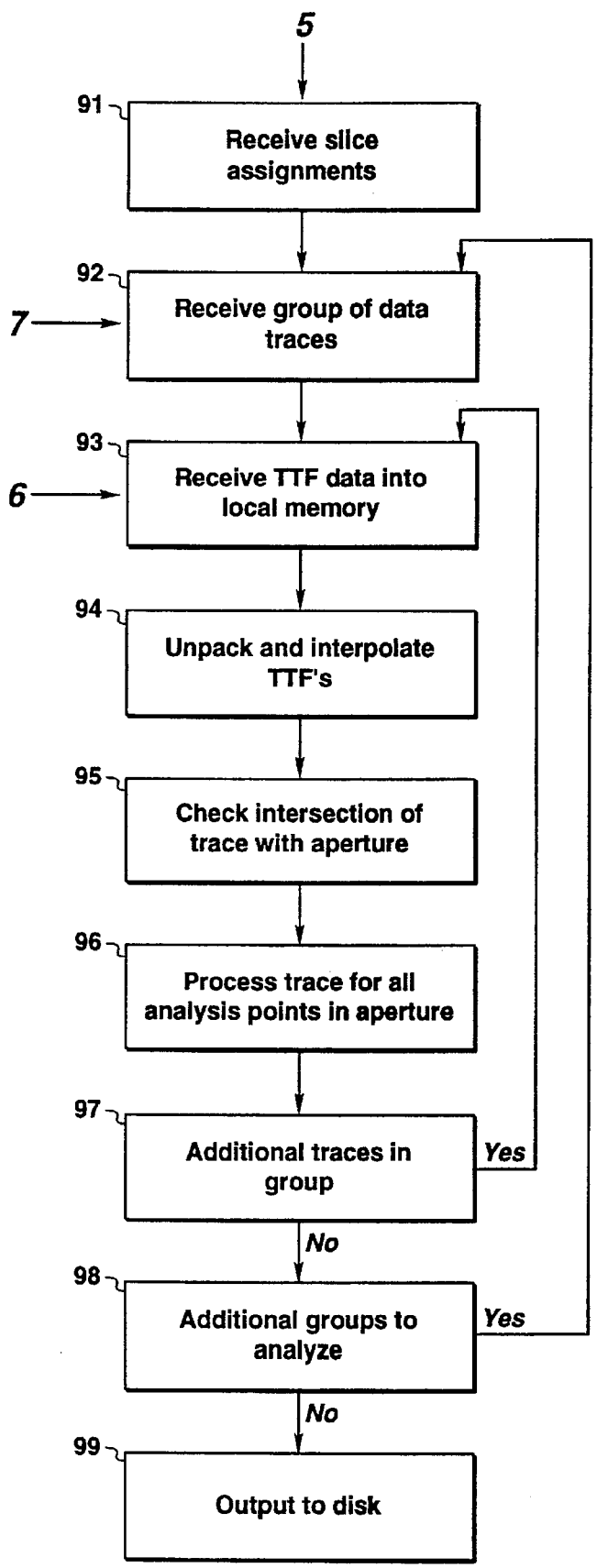
FIG. 8 depicts a block diagram of the Analysis phase of the present method.

The second phase of the method, depicted in FIG. 8, involves the MPP computations which are the objective of the overall seismic analysis procedure. This phase of the method optimizes use of each processor in the MPP by broadcasting seismic data traces to all processors, thereby allowing each processor to perform data processing calculations independent of all other processors. The result is a data processing method which solves seismic data analysis problems more quickly and in a more cost effective manner than prior art techniques.

For convenience, the detailed description of the present invention is organized as follows:

I. Massively Parallel Processor Architecture
II. Data Acquisition Configuration
III. Data Processing—Setup
   A. Depth Slice and Aperture Specification
   B. Traveltime Field Specification
   C. Processing Optimization
IV. Data Processing—Analysis However, this organizational outline is not to be construed as limiting, but merely is provided to simplify discussion of the components of the present method.

I. Massively Parallel Processor Architecture

Figure 1:
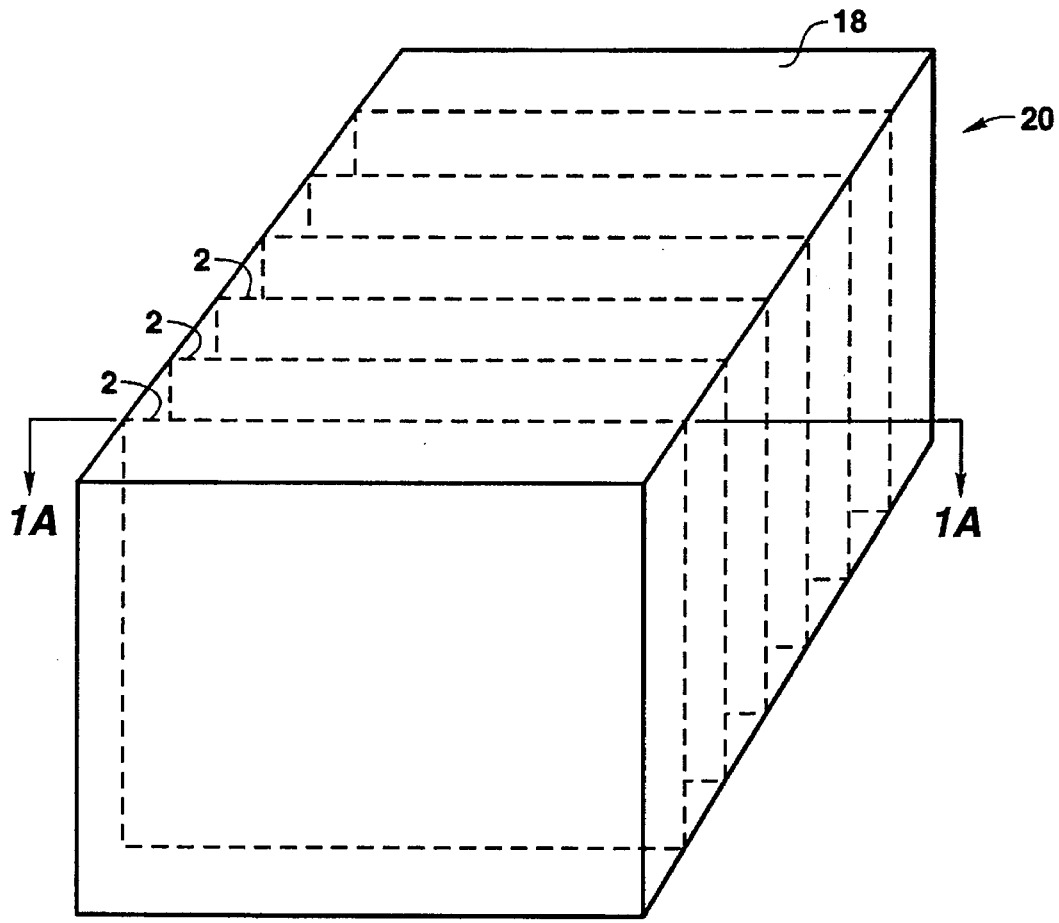
Figure 1A:
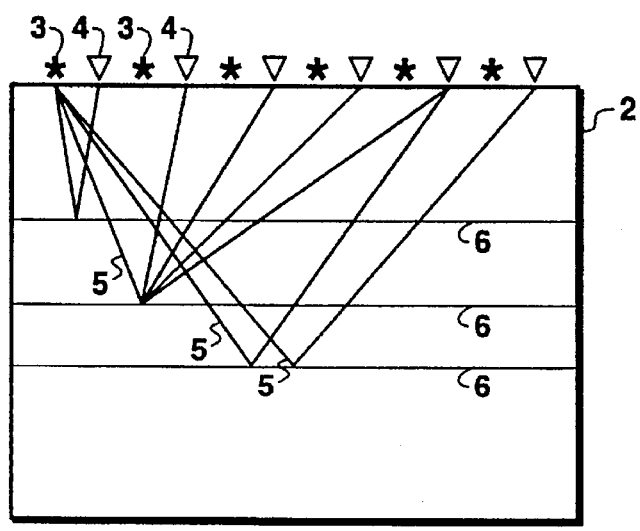
Figure 2:
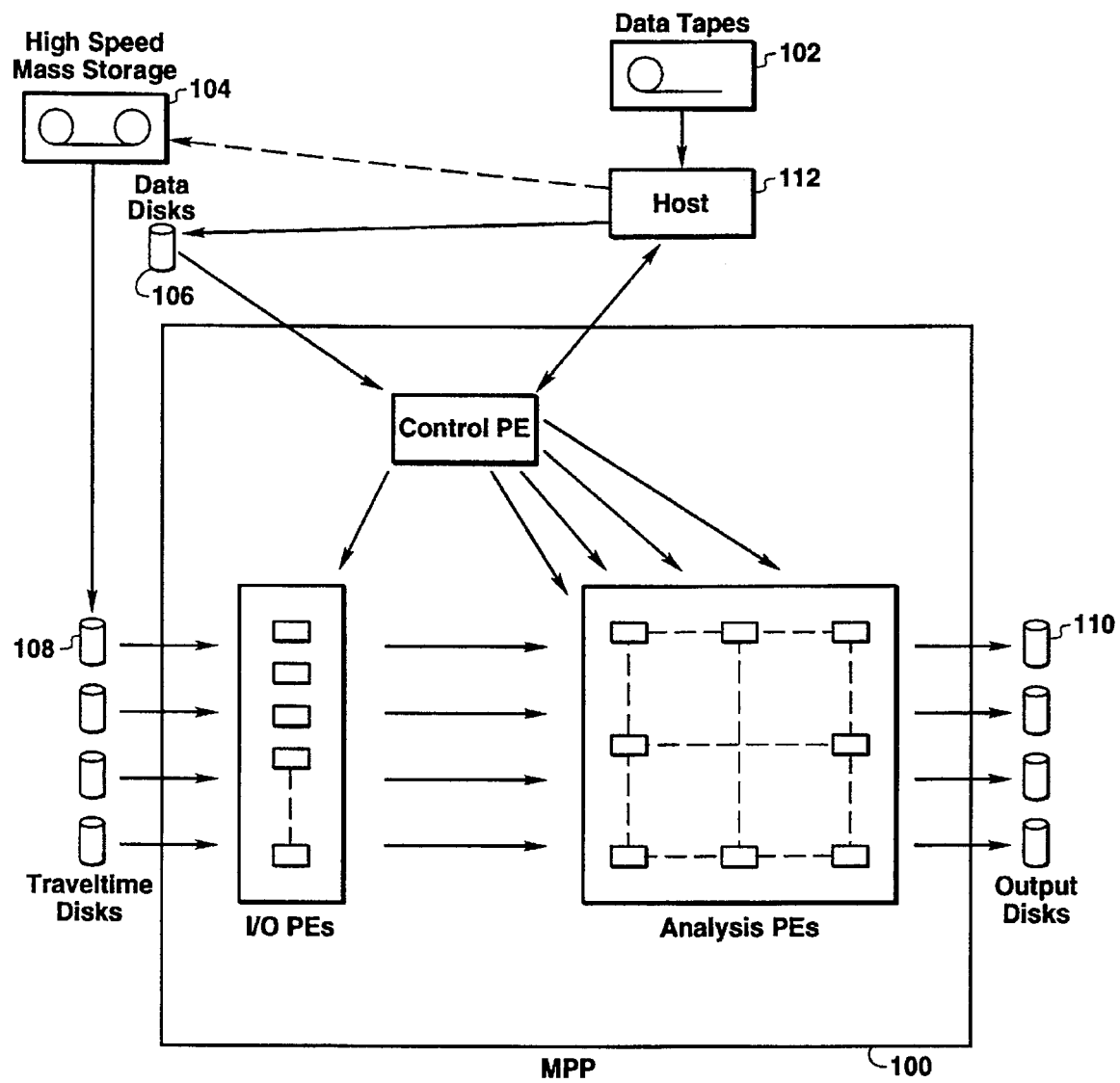
FIG. 2 depicts a simplified functional block diagram of a parallel processing system on which seismic data processing using the present method may be performed.

The description of the present method of processing seismic data may be simplified by first describing one embodiment of an MPP system on which the method may be carried out. As depicted in FIG. 2, the components of the MPP system will typically consist of an MPP 100, a data tape storage facility 102, a high speed mass storage facility 104, data disks 106, traveltime disks 108, output disks 110, and a host computer 112. In a preferred embodiment, the MPP 100 should be capable of performing in the multiple instruction stream/multiple data stream mode of operation (MIMD). This mode of operation allows each processor to perform different tasks simultaneously and on different sets of data, if programmed to do so. The method may also be advantageously employed on computers using other modes of operation, for example single instruction stream/multiple data stream (SIMD). This mode of operation has all processors simultaneously performing the same tasks, but on different sets of data. An MPP 100 suitable for use in this MPP system is the T3D manufactured by Cray Research, Inc., which is a MIMD MPP. Other MPP systems suitable for processing seismic data using the present method will be known to those skilled in the art.

In a preferred embodiment of the present method, the processing elements (PEs) in the MPP 100 are subdivided into three functional categories. Analysis PEs perform the detailed computations, and in number comprise the largest category of PEs in the MPP. Input/output (I/O) PEs are assigned the task of transmitting traveltime (TT) data from traveltime disks to the analysis PEs. A control PE transmits I/O access requests to the I/O PEs and seismic data traces from data disks to the analysis PEs. The control PE also communicates with the host computer, which coordinates the transfer of seismic data from data tapes to the data disks and submits commands for the transfer of TT data from TT mass storage to TT disks upon receiving requests from the control PE. This functional breakdown of the PEs provides several advantages in the present method over the prior art. First, the analysis PEs are each programmed to perform analysis tasks substantially independently of all other components of the MPP system, except as to the actual receipt of data required for processing. This attribute, combined with the use of tape and disk storage facilities and the host computer for I/O and pre- and post-processing of the trace data, maximizes the MPP's throughput by limiting analysis PE duties to those analysis tasks. Second, the control PE under this categorization is programmed to look forward to upcoming analysis tasks to ensure that appropriate seismic and traveltime data are simultaneously available when required by the analysis PEs. This attribute allows for optimization of the order in which data are transferred to the analysis PEs. Third, once traveltime data are transmitted to traveltime disk, the I/O PEs can operate in an input/output mode independent of further commands from the control PE. This eliminates any requirement that the individual analysis PE's communicate with tape or disk mass storage facilities, which increases overall system I/O reliability and minimizes interference between analysis and Input/Output. Together, these advantages of the present method facilitate data throughput in the present method, thus leading to analysis cost and time benefits as compared to prior art methods.

Preferably, the MPP architecture is such that each PE contains a microprocessor element and random access local memory connected by high bandwidth data transfer capability. Each microprocessor should preferably have a minimum of 64 megabytes of local memory. That minimum amount will allow multiple offsets to be simultaneously processed for dataset sizes of typical interest in three dimensional seismic data analysis (as further detailed below). Local memory within each PE is preferably part of a shared memory system under which each PE has equal access to the local memory of other PEs. This MPP architecture style, in which memory capacity is physically distributed among the PEs but logically shared, allows for the minimization of I/O access of TT data from the I/O PEs to the analysis PEs (This system is referred to as a low latency type of MPP architecture). Other types of MPP architectures, for example, the message passing class used in such MPPs as the Intel iPSC/860 Hypercube, may only share or exchange data by explicitly passing a message between PEs. The present method may be employed on such message passing systems, although the requirement that explicit messages be passed for data sharing is generally more time consuming than desired relative to processor speed (Such a system is referred to as a high latency MPP architecture).

No specific number of processing elements (PEs) is required in the MPP to implement the present invention. In a preferred embodiment the MPP will typically have a total of at least 64 PEs. In an embodiment of the present invention involving 128 PEs, one control PE will typically communicate with 8 I/O PEs and 119 analysis PEs. However, seismic applications involving a large subsurface analysis cube, thereby requiring a high computational load, may require fewer I/O PEs and more analysis PEs. No maximum number of processing elements exists for implementation of the present method. Among the considerations to be used to determine the total number of PEs to be included in the MPP for implementation of the present invention include capital cost, the frequency with which seismic processing efforts are expected to be carried out, and the general nature of the types of processing problems which are expected to be faced. These considerations will be well known to those skilled in the art. In the following, the acronym "PEs" will be used for convenience in place of the phrase "analysis PEs."

The host computer 112 facilitates seismic trace data transfers from data tapes 102 to data disks 106 by acting in a server mode upon receiving commands from an MPP control processor. However, the host 112 initially acts in an independent mode at startup, so as to facilitate user inputs and initialization procedures. The host computer 112 should be a high speed computer system, such as a member of the Cray Y-MP series of computers, since data transfers coordinated by the MPP must maintain a rate sufficient to avoid computation time delays by the processors in the MPP. Use of the Y-MP also facilitates checkpointing by allowing regular snapshots of the state of the analysis to be saved, thereby facilitating restart of the analysis phase if interrupted before completion. Finally, the Y-MP is also designed to interface with tape storage components in a more straightforward, more reliable manner than are typical MPPs.

Although FIG. 2 depicts both a host computer 112 and a control PE within MPP 100, it is not a requirement of the present method that both be present in the MPP system. Specifically, in alternate embodiments the functions performed by the control PE could be performed by the host computer, thereby eliminating the control PE completely. Another embodiment of the present method would eliminate the host computer, and have one or more processing elements in the MPP 100 performing both the functions of the control PE and the functions of the host computer 112. The system of FIG. 2 is a preferred embodiment, but is not limiting.

The host computer 112 also coordinates transfer of traveltime data from high speed mass storage 104 to traveltime disks 108. Because of the volume of traveltime data that may be required in three dimensional seismic processing—a typical processing effort may have 60,000 traveltime fields, each of which may be as large as 8 megabytes in size or more—it is important that these traveltime fields be efficiently handled. Frequent recomputation of the individual values required for a processing effort is not cost effective. In the present method, traveltime fields are precomputed for a coarse grid and stored on a high speed mass storage facility, thus allowing subsequent traveltime computations to be limited to interpolations of the stored fields. As depicted in FIG. 2, one specific technology adequate to transfer the stored traveltime field subsets to disk is the D2 tape used in the Data Tower manufactured by E-Systems, Inc. Technical specifications which make D2 tapes attractive components for implementing the present method include high capacity (minimum of 25 gigabytes) and high transfer rate capability (15 megabytes/sec). However, the high speed mass storage facility may rely on any data storage technology with sufficient capacity and transfer rate capabilities. For example, digital tapes, optical media and other disk-type media, and digital/analog tapes all may be considered for use as mass storage 104. The need for this high capacity/high transfer rate capability directly results from the volume of traveltime field data that is required for typical three dimensional data analysis and interpretation efforts, and is also dependent on the number of analysis. PEs available to perform computations. Without these capabilities, data storage and transfer bottlenecks would result, thereby hindering performance and reducing overall analysis throughput. For convenience in the following, but not to be construed as limiting, high speed mass storage will also be referred to as traveltime tape mass storage.

The seismic trace data is stored on data tapes 102 and transmitted to disk in an optimized sequence as further described herein. These data tapes may be any of a number of well known mainframe computer tape storage facilities 102, such as the IBM 3480/3490 tape system.

The disk mass storage devices used for the data disks 106, traveltime disks 108, and output disks 110, may be any of a number of well known components, such as the DD-60 disks manufactured by Cray Research, Inc. The disks should have a relatively high bandwidth data transfer capability, and have controllers which accept multiple channels, preferably at least four channels, of data on input and have high bandwidth data transfer capabilities (preferably 100 megabytes/sec minimum) on output. The output bandwidth is a function of disk speed and the number of disks which can be ganged together, as will be understood by those skilled in the art.

II. Data Acquisition Configuration

Figure 3:
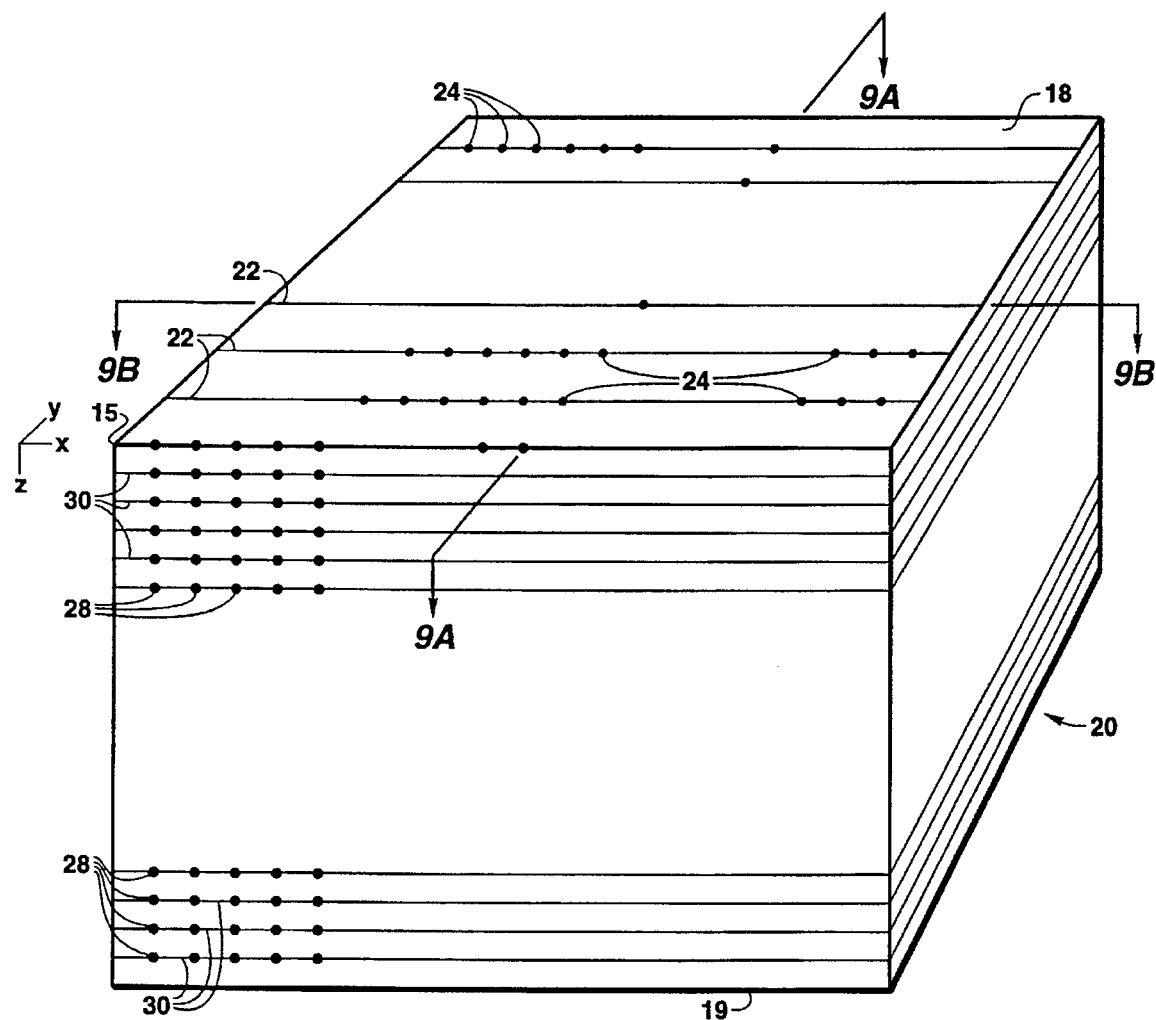
FIG. 3 depicts the data acquisition cube and depth slice configuration to which the present method is directed.

The present method focuses on developing a geophysical image of all or a portion of a generally cubic region 20 of the earth, such as is shown in FIG. 3. Cubic region 20 will also be referred to as data acquisition cube 20. Seismic data will have been acquired along the earth's surface 18, which may also be on or near the surface of a body of water, using seismic sources placed along shotlines 22 at source locations 24. For each source location 24, reflection data from within data acquisition cube 20 will be obtained from as many as one hundred or more receivers (not shown) placed along the same shotline 22 on which source location 24 lies, with receivers sometimes being additionally placed along one to five or more shotlines 22 adjacent to the shotline on which source 24 lies.

The overall dimensions of cube 20 will vary from dataset to dataset, although surface 18 over which data is acquired may encompass as much as or more than several hundred square kilometers in area. Furthermore, the term "cube" is used herein for convenience only; cube 20 may involve a cubic geometry, having six congruent square faces, or may involve a parallelepiped. In addition, cube 20 may involve other irregular shaped three dimensional volumes; nothing herein is to be construed as limiting otherwise.

The spacing between shotlines 22 will generally be a few tens of meters, with a spacing between source locations 24 on each shotline 22 as little as a few meters, or as much as tens of meters. However, each of these dimensions will vary depending on the specific geologic structure which is being investigated. For example, study of a complex salt feature, such as is often the focus in three dimensional seismic data processing, may require very closely spaced shotlines and source locations. On the other hand, larger features for which only broad resolution is required may allow larger spacings, and use of traditional two dimensional analysis techniques. The considerations required to determine spacings which are appropriate for study of a specific geologic feature will be well known to those skilled in the art. An advantage of the present invention is that data acquired from either traditionally spaced shotlines and source locations, or from the relatively closely spaced shotlines and source locations often required in three-dimensional seismic processing, may be processed with lower computation times and costs than have heretofore been possible.

III. Data Processing—Setup

Figure 6:
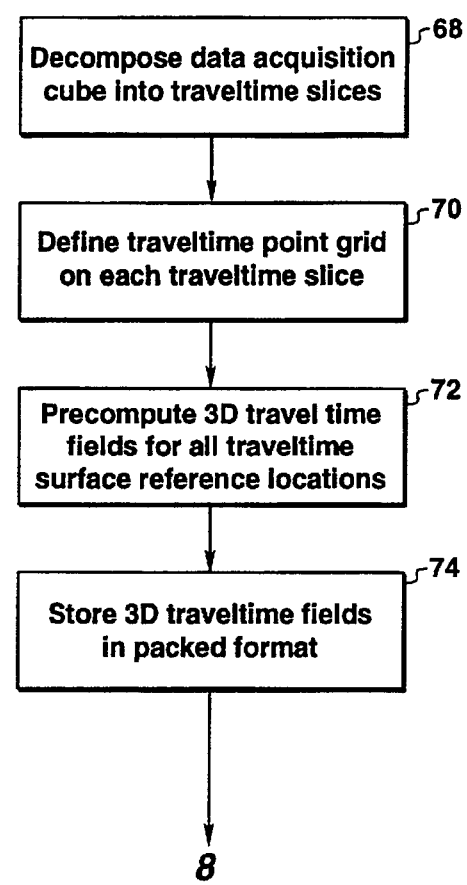
FIG. 6 depicts a block diagram of the traveltime field specification task of the Setup phase of the present method.
Figure 7:
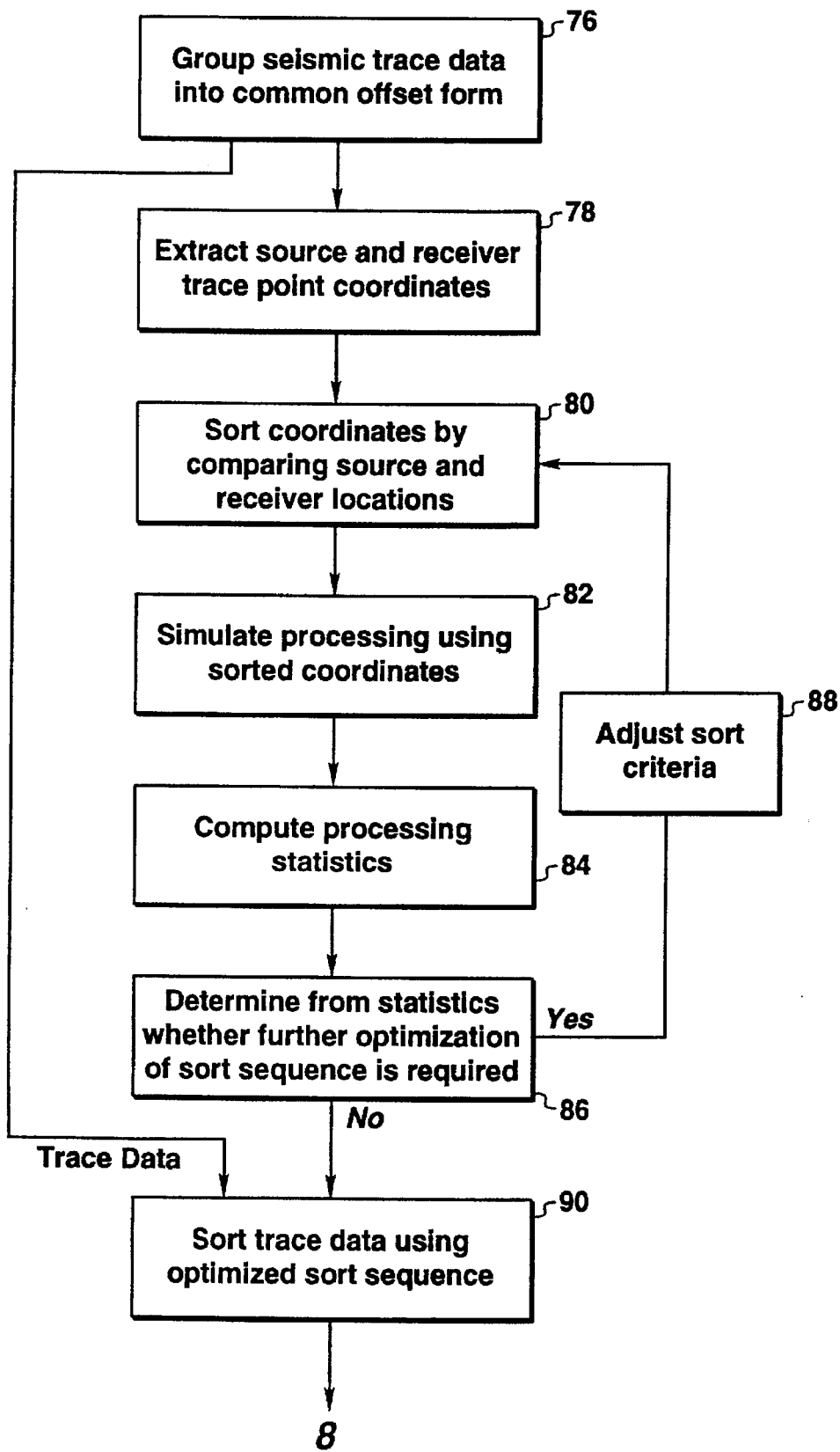
FIG. 7 depicts a block diagram of the processing optimization task Of the Setup phase of the present method.

The Setup phase of the present method comprises three principal tasks: depth slice decomposition and aperture specification (FIG. 5), traveltime field specification (FIG. 6), and migration optimization (FIG. 7). Broadly stated, the objective of the Setup phase is to provide a processing structure which allows the analyst to closely manage seismic and traveltime data I/O and computation burdens, and to maintain tight control of the allocation of computer memory between the seismic and the traveltime data.

Figure 4:
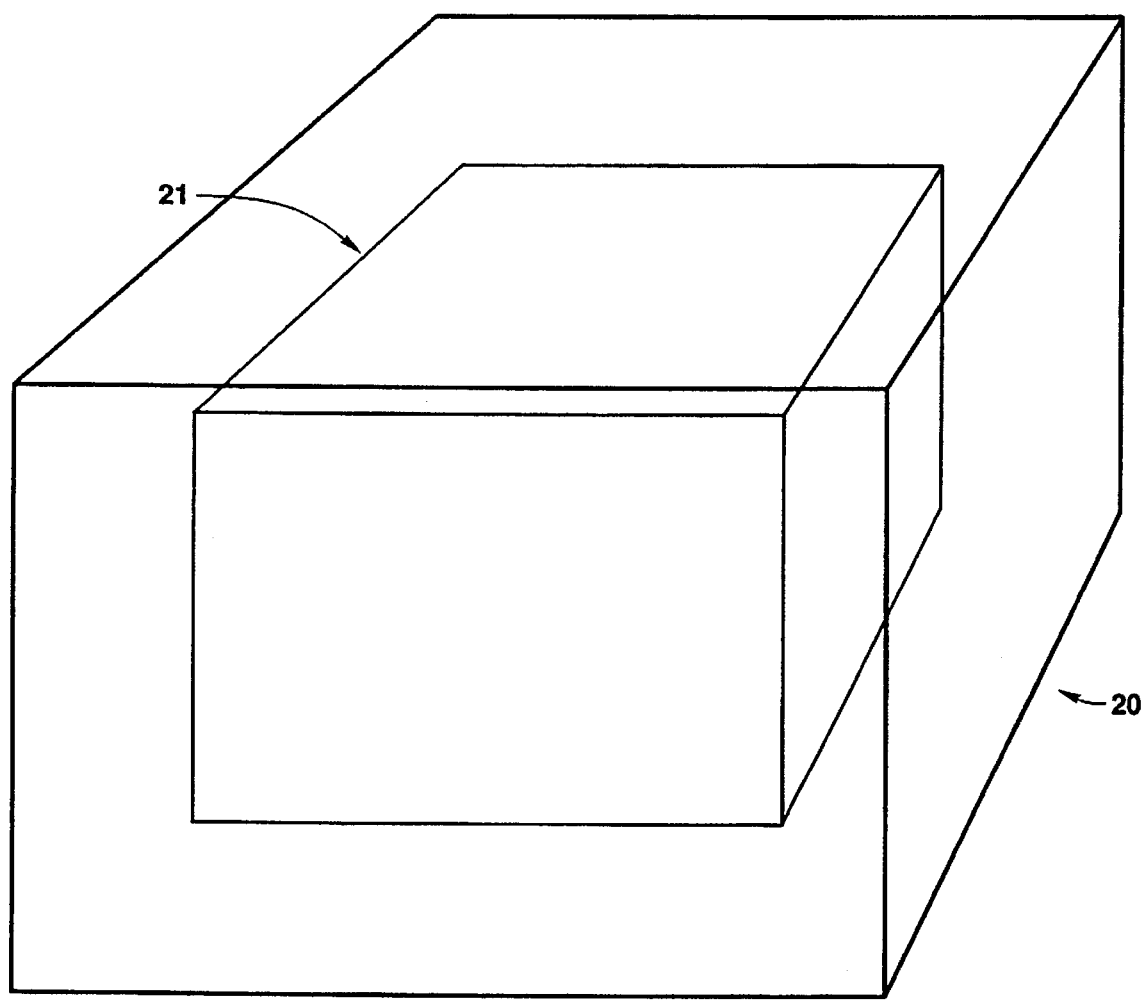
FIG. 4 depicts an analysis cube subset of a data acquisition cube.

The Setup phase may focus on the entire volume of data acquisition cube 20, as depicted in FIG. 3, or on a subset of cube 20, such as cube 21 shown in FIG. 4. The subset of cube 20 on which the Setup phase is focused is often referred to as the analysis cube or the image cube. Preferably, the data acquisition cube will be somewhat larger than the analysis cube, with the size difference facilitating the desired analysis by allowing sources and/or receivers which are outside the analysis cube but within the data acquisition cube to contribute to the analysis results. This consideration will be well known to those skilled in the art. In the following, for convenience but not as a limitation, the analysis cube will be assumed to be dimensionally identical to the data acquisition cube, with the term analysis cube and the reference number 20 used exclusively.

An advantage of the present method is that substantially larger analysis cubes can be analyzed than can be analyzed by prior art methods. For example, data processing constraints inherent to prior art methods often force analysts to focus on specific targets within a data acquisition cube using a technique referred to as target-oriented processing. The present method reduces computation time and cost for target-oriented processing, but also allows the entire volume of a data acquisition cube to be analyzed, thus facilitating more comprehensive seismic processing than has previously been possible.

A typical analysis cube to which the present invention is directed might involve a fifteen kilometer by fifteen kilometer area, (surface 18 in FIG. 3), with shotlines 22 having approximately a 30 meter spacing. Cube 20 may extend from five to ten kilometers below surface 18. An object of the present invention is to facilitate seismic processing of the entire volume of an analysis cube of that size or larger using an MPP and requiring only one calendar month or less of actual processing time. Presently available methods for seismic processing require substantially in excess of one month and up to or more than one year to complete such processing. However, the present invention is not to be limited to analysis cubes of this size. On the contrary, the present method can be usefully applied to a wide variety of analysis cube sizes, as well as to target oriented processing; nothing herein is to be construed as limiting otherwise.

A. Depth Slice and Aperture Specification

The potential analytic benefits of decomposing an analysis cube into substantially equally spaced, substantially horizontal depth slices (the Z axis in FIG. 3, where the origin of the coordinate system is shown as 15) are well understood in the art. However, as indicated above, the time and cost limitations of prior art methods have not allowed complete analysis cubes to be analyzed. Furthermore, target oriented methods are not generally structured so as to require or benefit from depth slice decomposition. For these reasons, prior art methods have not successfully incorporated horizontal depth slice decomposition with either a target-oriented or a full cube analysis capability.

In the present method, the number of and spacing between depth slices (60 in FIG. 5) will typically depend on the goals of the analysis and the expected characteristics of the features within the cube. For example, decomposition of a cube 20 into 1024 depth slices 30 with a depth slice spacing of 7.5 meters would be sufficient for analysis of a cube 20 extending 7.68 kilometers from surface 18 to basement 19 (FIG. 3). Among the other factors on which depth slice spacing may depend are the total number of PEs (analysis, control, and I/O) in the MPP on which the present method is to be employed.

Figure 5:
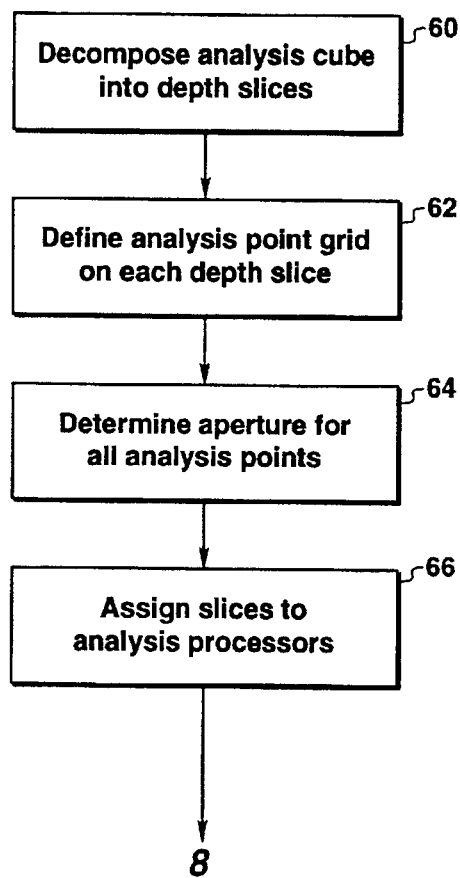
FIG. 5 depicts a block diagram of the depth slice decomposition and aperture specification task of the Setup phase of the present method.

On each depth slice 30, the spacing and location of analysis points 28, which are those points at which the subsequent calculations will be performed, must also be defined (62 in FIG. 5). A typical dataset to which the present invention is directed may, for example, involve a grid of 500 analysis points extending along both the X and the Y axes (FIG. 3), such that the grid on each depth slice contains 250,000 analysis points. However, analysis point spacing will also depend on the goals of the analysis and the expected characteristics of the features within cube 20, as will be understood by one skilled in the art.

Once the analysis cube has been subdivided into depth slices and analysis points, one option for processing the seismic data would be to assign an equal number of depth slices to each PE in the MPP, then directly proceed with processing the seismic data for all analysis points on all slices. However, processing all analysis points on all slices is inefficient for a number of reasons. For example, the seismic data traces acquired along each of the shotlines do not contribute equally to all portions of the desired image of the geological structure. Furthermore, it is well known that only those diffraction raypaths which are close to the reflection raypath for a given analysis point will contribute significantly to the image at that analysis point. This is true whether the image is formed using traditional diffraction summation techniques, Kirchhoff summation techniques, or other similar methods, all of which are well known to persons skilled in the art. If a data trace has such a contributing raypath, it is said to fall within the aperture of the specified analysis point. Therefore, to the extent that raypaths that are not within the aperture for any specified analysis point can be predetermined and excluded from subsequent processing, the seismic data will be more efficiently processed.

For these reasons, the present method includes the step of determining the aperture for each analysis point on each depth slice (64 in FIG. 5). The advantage of this step of the present method is that the aperture for an analysis point can be determined using relatively straightforward, non-computer time intensive computation procedures. The result is that those seismic traces which do not contribute to the image at specific analysis points can be eliminated from subsequent processing procedures on those analysis points, thus reducing the time and cost of the overall processing effort. This is an improvement over prior art methods, which perform analyses for all traces for all analysis points, without aperture considerations.

Aperture computation procedures are well known in the art, and, for example, can be performed using the technique referred to as kinematic migration, which is also sometimes referred to as map migration. Map migration offers a method of determining curves which define the locations to which specific reflections will migrate. Once those curves are defined, the seismic traces which contribute to the analysis points falling along those curves can be specified. Those traces are said to fall within the aperture for the specified analysis points. Seismic traces outside the aperture do not contribute to the image at those analysis points. A particularly efficient aperture computation method is discussed by Krebs in co-pending U.S. patent application Ser. No. 08/097817.

Figure 9A:
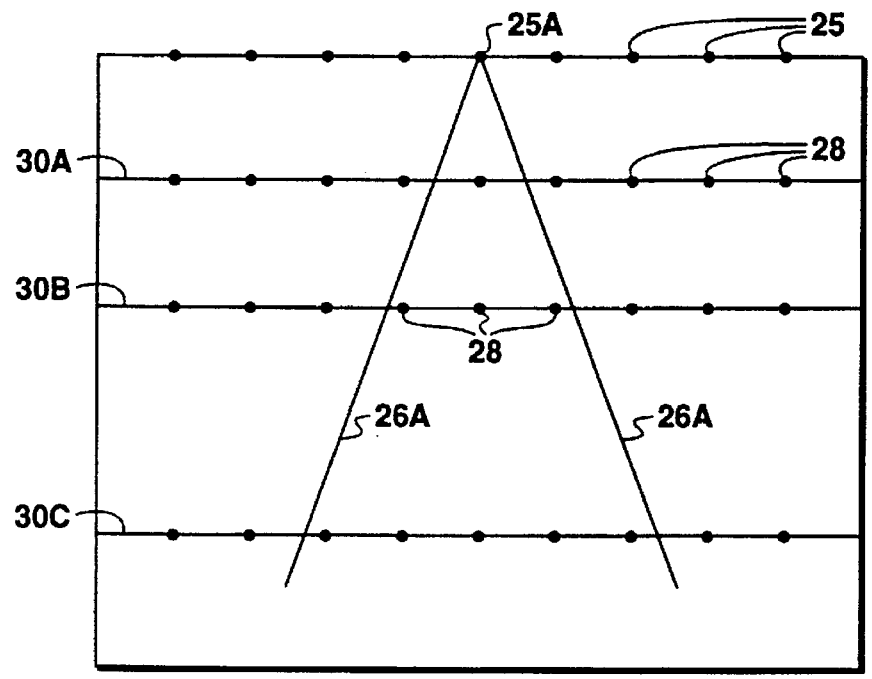
FIGS. 9A and 9B depict aperture boundaries for typical source-receiver midpoint locations on cross-sections taken through the data acquisition cube of FIG. 3.
Figure 9B:
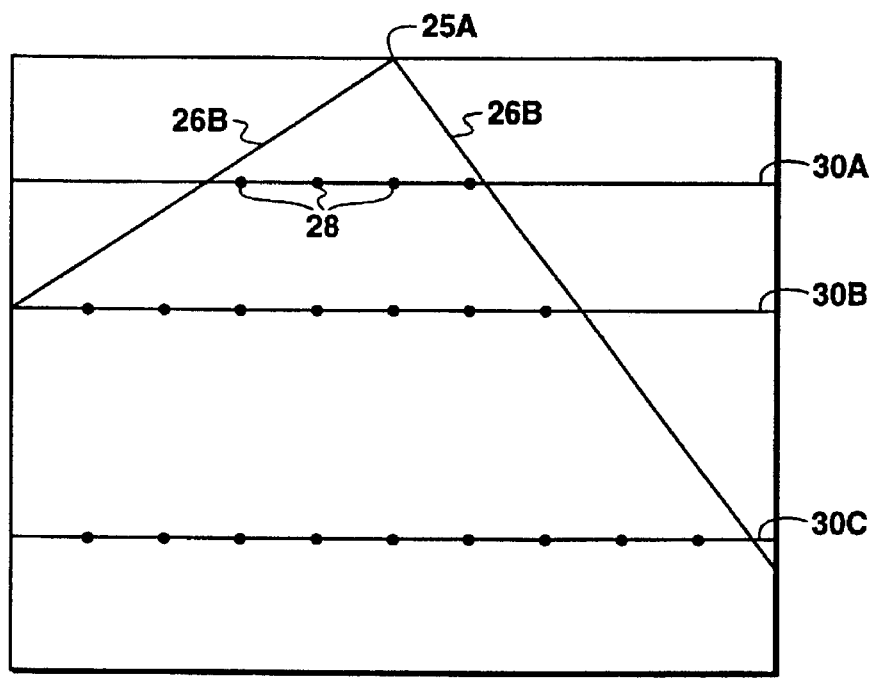

FIGS. 9A and 9B, which depict mutually perpendicular vertical cross-sections through cube 20 taken at the locations shown in FIG. 3, graphically demonstrate the benefit of determining the analysis point aperture for individual data traces. Seismic data trace locations for common offset source-receiver pairs are referenced by midpoint locations 25 along surface 18. Analysis points 28 on each depth slice 30 are the points at which the geophysical image is to be calculated.

The seismic data traces associated with each location 25 are typically assumed to contribute to the images associated with all analysis points on all depth slices. That assumption is not generally accurate, however, with any such contribution depending on the nature of the features, such as dipping and faulting. Using the procedures referenced above, the present method includes the step of computing the aperture for each location 25. For example, the aperture for location 25A in FIG. 9A is defined by aperture boundaries 26A. The trace associated with midpoint 25A makes a contribution to the image at analysis points within that aperture, and therefore must be included in subsequent processing procedures. The trace associated with midpoint 25A does not make such a contribution to analysis points outside that aperture, and therefore that trace can be excluded in subsequent processing as those analysis points.

As shown in FIG. 9A, the width of boundaries 26A are a function of depth within analysis cube 20. That width will also generally be a function of the source-receiver offset associated with midpoint 25A, and in addition may vary along surface 18 with different locations 25. For example, the aperture will generally be truncated at the boundaries of the image cube. Therefore, the aperture width for an analysis point relatively close to the boundary will be somewhat smaller than the width for an analysis point more centrally located within the analysis cube. In addition, aperture boundaries 26 for a location 25 may vary with compass orientation within cube 20. For example, the aperture inline with a shotline will often be wider than the aperture perpendicular to that shotline. FIG. 9B depicts a cross-section through cube 20 perpendicular to the cross-section of FIG. 9A. Aperture boundaries 26B are the boundaries for location 25A in the cross-section of FIG. 9B. As suggested from a comparison of FIG. 9A and 9B, boundaries 26B are wider than are boundaries 26A. The present method allows for the aperture width to not only be depth and offset dependent, but also to vary with compass orientation.

Aperture width at any given depth will in principal vary in an irregular manner with compass orientation. However, in the preferred embodiment of the present invention, aperture boundaries are calculated along two perpendicular sections, such as shown in FIGS. 9A and 9B, and result in either square or rectangular regions being defined at each depth. This embodiment simplifies the storage of the aperture width data in memory for subsequent use. For example, the use of circular aperture regions would require use of trigonometric functions at each depth to determine whether an analysis point is within the aperture, thus adding an additional complexity in subsequent processing procedures.

Several options exist for storage of aperture region dimensions. In one embodiment of the present method, aperture region dimensions are input by the user either in functional or in tabular form as lengths along the X and Y axes of FIG. 3. The input forms will generally vary with depth, offset, and location along surface 18, but may also be specified as constants if so desired by the analyst. For example, a constant aperture dimension of 5,000–7,000 meters is adequate for many analysis efforts. Alternatively, for datasets deriving from the offshore environment, a functional or tabular form involving a relatively narrow region within the water layer will reduce noise levels resulting from that layer. In such situations the aperture region will generally be larger for layers below the seabed. In either case, the dimensions of the aperture region at each depth are retained in the memory of the processor performing calculations for that depth, as further described below in the Data Processing—Analysis section.

In another embodiment, aperture boundaries may be calculated for all analysis points over all depths and stored in host computer memory as an aperture map of cube 20. That map would allow the calculation load associated with each depth slice to be estimated, since calculation load is proportional to the number of analysis points for which processing is to occur for each source-receiver midpoint location. This embodiment allows the depth slices to be distributed to processors in the MPP so as to balance calculation load.

Determination of aperture region dimensions facilitates the final step of the first Setup task. This step involves the assigning of depth slices to the analysis PEs (66 in FIG. 5). A number of options exist for making this assignment. For example, as indicated above, one depth slice assignment method is to divide the slices into groups having an equal number of contiguous slices and assign the groups among all analysis processors. However, as indicated in FIGS. 9A and 9B, depth slices relatively close to surface 18 will generally be associated with narrower apertures than the apertures associated with deeper depth slices, and therefore will also have lower calculation loads. As a result, analysis PEs assigned relatively shallow depth slices would, under this equal assignment scheme, have lower calculation loads than PEs assigned deeper depth slices. As a result of that lower calculation load, the PEs assigned shallow depth slices will tend to complete their analysis tasks prior to the moment at which the PEs assigned deep depth slices complete their assigned analysis tasks. For that reason, the shallow PEs are forced to wait for the deep PEs to complete analysis before additional groups of seismic trace data can be transmitted to the MPP if trace data broadcast only occurs when all PEs are ready to accept additional trace data (as further described below under Data Processing—Analysis).

An alternate approach is to assign depth slices to each analysis PE in such a manner as to balance the overall calculation load placed on all PEs. One option under this approach is to assign a varying number of depth slices to each analysis PE based on depth within cube 20 and the relative calculation load of each slice. Under this option, groups of depth slices would be assigned to each analysis PE, but each such PE would not necessarily be assigned the same number of depth slices. For example, an analysis PE might be assigned several relatively shallow depth slices, while another analysis PE might only be assigned a single, relatively deep, depth slice, with the result being that both PEs have comparable overall calculation loads.

A second option under this alternate approach also serves to balance overall calculation load. In this approach, a relatively shallow depth slice and a relatively deep depth slice are assigned to each PE. Such an assignment scheme will result in an overall calculation load comparable to the calculation load of an analysis processor assigned two generally moderate depth slices, thereby generally balancing the calculation loads assigned to all analysis PEs.

One limitation exists as to both of the load balancing depth slice assignment options. As will be further discussed below under traveltime field specification, each analysis PE will require certain traveltime data as input to the analysis phase of the method. Both of the load balancing depth slice assignment options place a greater traveltime I/O and storage load on the analysis PEs than does the equal assignment approach. At present, therefore, a preferred embodiment of the present method involves assignment of equally-sized groups of depth slices to all processors to minimize the traveltime I/O and storage load. Apertures for the slices are transmitted to the local memory of the processors and are retained in memory for use during the analysis phase of the present method.

The above method of decomposing an analysis cube into horizontal depth slices and precomputing an analysis aperture has a number of advantages over the prior art. For conventional analysis efforts, such as prestack Kirchhoff time or depth migration and dip moveout, each depth slice can be analyzed independently of other depth slices. This eliminates the need to transmit trace data sequentially through the MPP, since each PE can be assigned unique groups of depth slices. As a result, such techniques in the prior art as nearest neighbor file and data swapping, node-to-node input and output data chains, and serial looping over depth are unnecessary. Each PE will only require the subset of the traveltime data associated with its assigned depth slices to perform analysis tasks, thus reducing the traveltime data I/O burden. Each PE is also assigned its depth slice duties at startup, without reassignments during processing. And finally, the present method requires only a single decomposition, that of either the geophysical model or of the geophysical image, thus simplifying the subsequent analysis tasks as compared to prior art techniques which sometimes require the decomposition of the input data, intermediate results, and the output data into components which can then be distributed within the MPP. For these reasons, the combination of the MPP system functional breakdown described above and this depth slice and aperture specification technique provides MPP throughput capabilities not obtainable by prior art methods.

B. Traveltime Field Specification

In determining the contribution that a specific seismic trace makes to an analysis result at an analysis point, the traveltime associated with the source and receiver combination associated with the trace and the analysis point must be calculated. Generally, traveltime is computed in three steps. First, the traveltime from the source location to the analysis point is calculated. Second, the traveltime from the analysis point to the receiver location is calculated. Finally, these two traveltimes are summed to give the total two way traveltime for that source-receiver combination and the analysis point.

Because traveltime data are a necessary input in seismic analysis, traveltime data storage and communication challenges are among the most time and cost intensive challenges faced by the seismic data analyst. One common solution to those challenges is to limit the size of the region within the analysis cube on which detailed processing is carried out, using target-oriented seismic processing. Processing as to other portions of the analysis cube is not performed, thus reducing the overall processing effort. A second option, commonly used along with target-oriented processing, involves the computation of two-way traveltimes shortly before or at the instant the traveltime is required by the processing algorithm. This "on the fly" calculation of traveltimes avoids the necessity of providing for traveltime storage on computer disk, but requires repetitive calculation of traveltimes.

Both of these commonly employed techniques limit data analysis and interpretation. Target-oriented processing is less desirable than full cube processing for the data interpretation phase, as is well known in the art, because a smaller image results on which the interpretation can be based. In addition, computation of traveltimes "non the fly" adds both cost and time to the overall processing effort, significant limitations in the highly cost competitive processing industry. The present method provides improved traveltime data access for each processor in the MPP by precomputing only a coarsely gridded subset of the necessary traveltime data and efficiently balancing the use of computer memory and input/output communication links for transferring that data from tape to disk mass storage devices to the processors.

The present method provides this improved access by allowing a characteristic of the traveltime data to work to the benefit of the analyst. In general, traveltime data vary relatively slowly in space throughout an analysis cube. As a result, traveltime data can be stored for a subset of locations within an analysis cube, as compared to the number of analysis point locations, without loss of interpretational resolution. Well-known interpolation procedures can be used to compute traveltimes for the analysis points, source locations, and receiver locations which are not part of the traveltime subset.

Figure 10:
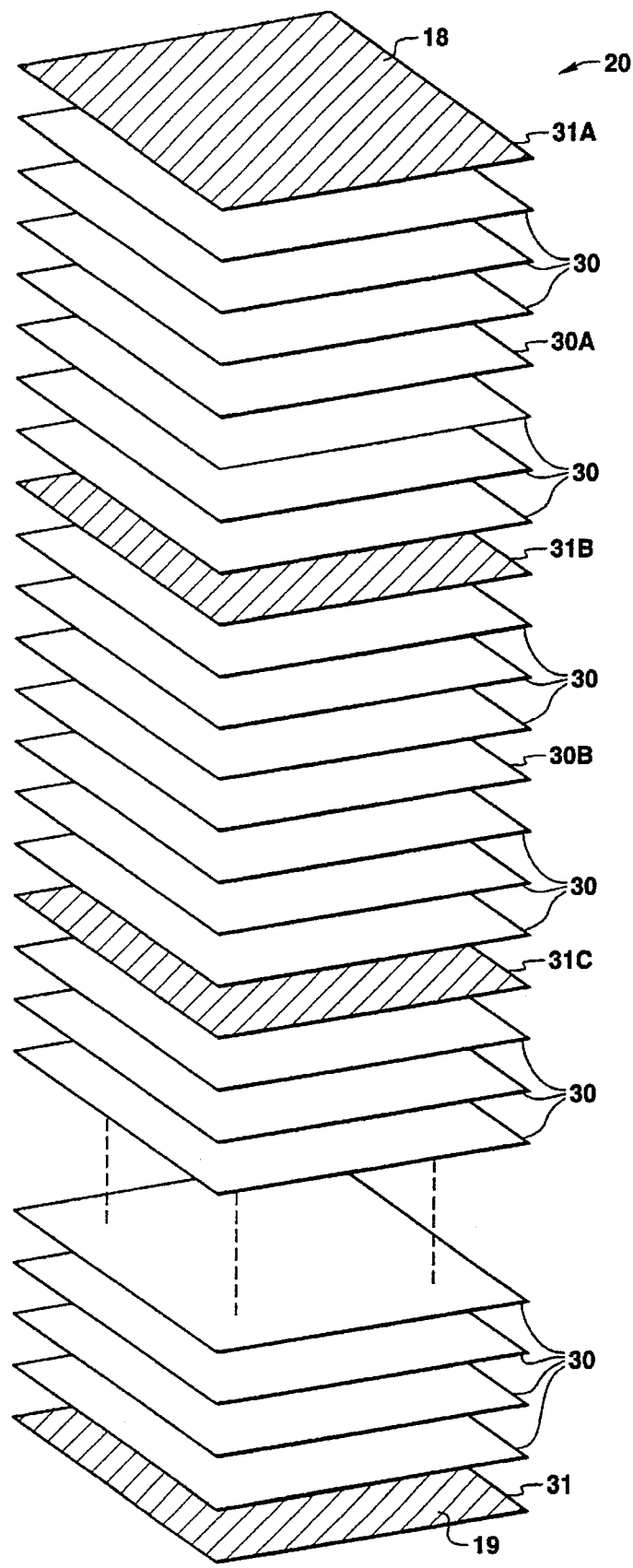
FIG. 10 depicts an exploded perspective view of an analysis cube subdivided into depth slices, with traveltime slices interspersed among the depth slices.

In the present method (68 in FIG. 6), the data acquisition cube is decomposed into horizontal traveltime slices which are parallel to or coincident with the depth slices. For example, FIG. 10 depicts a perspective view of cube 20 in which individual depth slices 30 are presented in exploded form. As discussed above, depth slices 30 subdivide cube 20 into horizontal planes. These depth slices traverse the entire depth of cube 20, from surface 18 to basement 19 (see FIG. 3). In addition, however, traveltime slices 31 are interspersed among depth slices 30 such that, in this example, each group of seven consecutive depth slices 30 are followed by a traveltime slice 31 which itself is coincident with an eighth depth slice 30. These coincident slices are referred to hereafter merely as traveltime slices 31. Each traveltime slice 31 represents a horizontal slice of analysis cube 20 to which both an analysis point grid is assigned, as discussed above, and a traveltime point grid is assigned, as further discussed below.

The eight to one depth slice to traveltime slice ratio depicted in FIG. 10 is for demonstrative purposes only, and may vary depending on the nature of the dataset that is involved, the number of processors in the MPP, and other factors which will be well known to those skilled in the art. For example, the memory available to each I/O processor will constrain both the size and the number of traveltime planes that can be transmitted by the I/O processor. Furthermore, certain datasets may allow use of a relatively smaller number of traveltime slices, for example as a result of a relatively simply or relatively slowly varying traveltime field, whereas other datasets may require relatively more traveltime slices as a result of more complex traveltime fields.

Preferably, the ratio of depth slices to traveltime slices is a power of 2 (i.e. 2:1, 4:1, 8:1, etc.). Power of 2 ratios facilitate use of faster integer arithmetic calculation routines, which in turn facilitates use of the dual instruction mode of the processors used in the MPP. The dual instruction mode allows both floating point and integer calculations to be simultaneously performed, as further described below under Data Processing—Analysis.

FIG. 10 can also be used to demonstrate the strengths and weaknesses of the depth slice assignment approaches discussed above. Assume, for example, that a single analysis PE is assigned the seven depth slices 30 sandwiched between traveltime slices 31B and 31C. It is well known in the art that traveltime data are required from each source and receiver location on surface 18 (not shown in FIG. 10) to each analysis point on each depth slice 30 in order to perform a desired seismic data analysis for the depth slice. In the present method, however, traveltime data are not precomputed and stored for each depth slice 30, but rather are only precomputed for each traveltime slice 31. Consider the depth slices between traveltime slices 31B and 31C, for example depth slice 30B. The analysis PE assigned depth slice 30B will require traveltime data from both slices 31B and 31C. The analysis PE will then be required to interpolate from slices 31B and 31C to depth slice 30B to determine the correct traveltime on which the seismic analysis is to be based. Because the PE will be required to perform that interpolation for each analysis point on depth slice 30B, it will be required to maintain the traveltime data for slices 31B and 31C in its memory while those calculations are occurring. If an analysis PE is only assigned all or a subset of the seven depth slices between 31B and 31C, then only traveltime data from slices 31B and 31C must be retained in that PE's memory for subsequent interpolation use. If, for example, an analysis PE is assigned depth slice 30A and 30B, the analysis PE must retain traveltime slices 31A, 31B, and 31C in memory for interpolation purposes. The additional traveltime slice requires additional local memory and increases the I/O and interpolation burdens on the analysis PEs. Both of the load balancing approaches discussed above suffer from these constraints.

For these reasons, the preferred embodiment of the present method assigns equally-sized contiguous groups of depth slices to each analysis PE. Furthermore, in that embodiment each analysis PE is assigned all depth slices between each consecutive pair of traveltime slices. Finally, in the preferred embodiment the ratio of depth slices to traveltime slices is 8:1. This results from the typical analysis goal of having approximately a minimum of 900 depth slices in the analysis cube. For example, for a 128 PE MPP, where 119 analysis PEs are available, 952 depth slices would result.

This embodiment of the present invention is demonstrated in Table 1. In this example, the analysis cube is decomposed into depth slices at ten meter intervals. The surface is assigned depth slice reference number 1 (DS1), the ten meter depth slice is DS2, twenty is DS3, etc. DS1 through DS8 are all assigned to processor number 1 (PE1), DS9–16 are assigned to PE2, etc. The surface is assigned traveltime slice reference number 1 (TTS1), but because of the eight to one depth slice to traveltime slice ratio, the next traveltime slice occurs at a depth of 80 meters (TTS2), and so on. As discussed above, each analysis PE requires two traveltime slices for interpolation purposes, and therefore TTS1 and TTS2 are both transmitted to PE1. TTS2 and TTS3 are both transmitted to PE2, and so on. This assignment pattern continues downward to basement 19 of the analysis cube (FIG. 3).

TABLE 1

| Depth (Meters) | Depth Slice # | Depth Slice Assigned to Analysis PE # | Traveltime Slice # | Traveltime Slice Assigned to Analysis PE # |
|---|---|---|---|---|
| 0 | DS1 | PE1 | TTS1 | PE1 |
| 10 | DS2 | PE1 | | |
| 20 | DS3 | PE1 | | |
| 30 | DS4 | PE1 | | |
| 40 | DS5 | PE1 | | |
| 50 | DS6 | PE1 | | |
| 60 | DS7 | PE1 | | |
| 70 | DS8 | PE1 | | |
| 80 | DS9 | PE2 | TTS2 | PE1, PE2 |
| 90 | DS10 | PE2 | | |
| 100 | DS11 | PE2 | | |
| 110 | DS12 | PE2 | | |
| 120 | DS13 | PE2 | | |
| 130 | DS14 | PE2 | | |
| 140 | DS15 | PE2 | | |
| 150 | DS16 | PE2 | | |
| 160 | DS17 | PE3 | TTS3 | PE2, PE3 |
| 170 | DS18 | PE3 | | |
| 180 | DS19 | PE3 | | |
| 190 | DS20 | PE3 | | |
| 200 | DS21 | PE3 | | |
| 210 | DS22 | PE3 | | |
| 220 | DS23 | PE3 | | |
| 230 | DS24 | PE3 | | |
| 240 | DS25 | PE4 | TTS4 | PE3, PE4 |
| ⁞ | ⁞ | ⁞ | ⁞ | ⁞ |
| ⁞ | ⁞ | ⁞ | ⁞ | ⁞ |
| ⁞ | ⁞ | ⁞ | ⁞ | ⁞ |
| Basement | | | | |

Decomposition of the analysis cube into the above described depth slice and traveltime slice structure facilitates traveltime calculations. However, this structure will only allow optimized traveltime calculations by each PE if an efficient traveltime storage technique is also used. The need for that efficiency becomes evident by reconsidering FIG. 3. Each source 24 on surface 18 represents a point from which traveltimes to all analysis points within cube 20 must be calculated for subsequent data processing. Similarly, each receiver (not shown) on surface 18 represents an additional point from which traveltimes to all analysis points within cube 20 must be calculated. Therefore, each such source and receiver is in effect the surface reference location of a three dimensional cube of traveltimes from the surface reference location to all analysis points on all depth slices. Each separate three dimensional cube of traveltimes for each such location on surface 18 will contain a unique 3-D matrix of traveltime values. Finally, the overall dimensions and total volume of each cube may vary between surface locations, as further described below.

To facilitate calculation of these traveltime cubes, a traveltime point grid is assigned to each traveltime slice 31 (70 in FIG. 6). And as with the traveltime slice decomposition, the traveltime point grid can generally be coarser than the analysis point grid as a result of the relatively slowly varying nature of the traveltime data. For data handling convenience, the traveltime point grid in a preferred embodiment of the present invention is defined on each traveltime slice so as to overlay the analysis point grid, with sequential traveltime points coincident with analysis points, but with additional analysis points interspersed between the traveltime points. Generally, the traveltime grid can be designed such that the ratio of analysis grid density to traveltime grid density is four-to-one or more. As with the depth slice to traveltime slice ratio, use of a power of two ratio of analysis grid density to traveltime grid density allows further optimization of the interpolation performed during the Data Processing—Analysis phase by again taking advantage of the dual instruction calculation mode, as more fully described below.

Figure 11A:
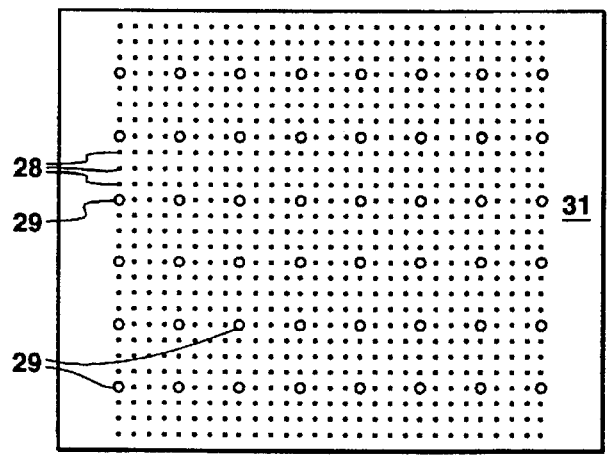
FIG. 11A depicts an analysis point grid and a traveltime point grid on a plan view of a typical traveltime slice.

As an example, FIG. 11A depicts a plan view of a typical traveltime slice 31 of cube 20. Traveltime grid points 29 are shown, with analysis grid points 28 between each consecutive pair of traveltime grid points. In addition, each traveltime grid point 29 is also the location of an analysis grid point.

Figure 11B:
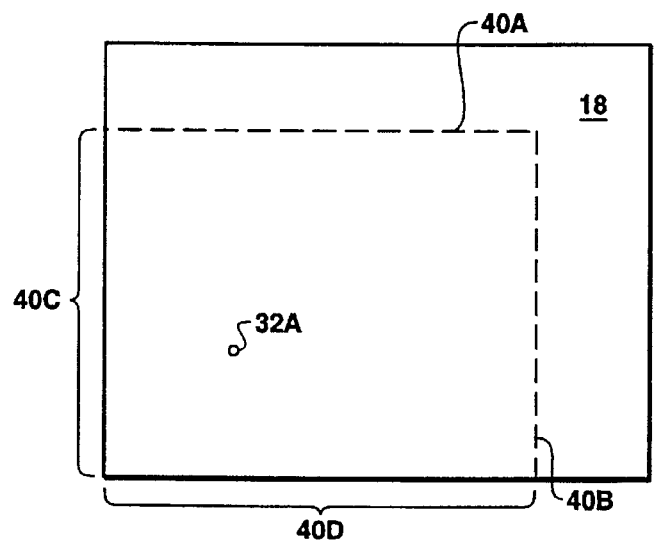
FIG. 11B depicts a plan view of the boundaries of a traveltime cube for a typical traveltime surface reference location.

As noted above, traveltime data are required for each location of a source or a receiver on surface 18 in FIG. 3. However, the slowly varying nature of the traveltime data also provides an opportunity in a preferred embodiment of the present method to reduce the number of traveltime cubes that must be stored. Specifically, the coarse grid of traveltime values used on each traveltime slice may also be applied to surface 18 to reduce the number of traveltime cubes which must be calculated. Use of that grid on surface 18 reduces the number of traveltime cubes to be computed from the total number of locations of sources and receivers on surface 18 to the number of points in the traveltime grid. For reference, the traveltime surface reference locations for which traveltime cubes will be computed are referred to in the following as traveltime locations 32 (as depicted in FIG. 11B).

As is well known in the art, the dimensions of the traveltime cube associated with each traveltime location 32 can be predetermined using an estimated velocity model and the input trace length, which is typically eight seconds. The estimate determines the maximum range within the analysis cube a trace can propagate, thus defining the maximum subsurface volume for which traveltime values must be computed. For example, FIG. 11B depicts a plan view of surface 18 from FIG. 3, with only one traveltime surface reference location 32A shown for convenience. Using the maximum range calculation, the maximum dimensions of the traveltime cube associated with location 32A can be determined. The surface boundaries of that traveltime cube are shown in FIG. 11B as boundaries 40A, 40B, 40C, and 40D. Note that boundaries 40A and 40B both lie on surface 18 in this example. Furthermore, boundaries 40C and 40D are both coincident with portions of the boundaries of surface 18. These boundaries define the surface of a three dimensional traveltime cube, as shown in FIG. 11C, within which traveltimes from location 32A to all traveltime points must be determined.

Figure 11C:
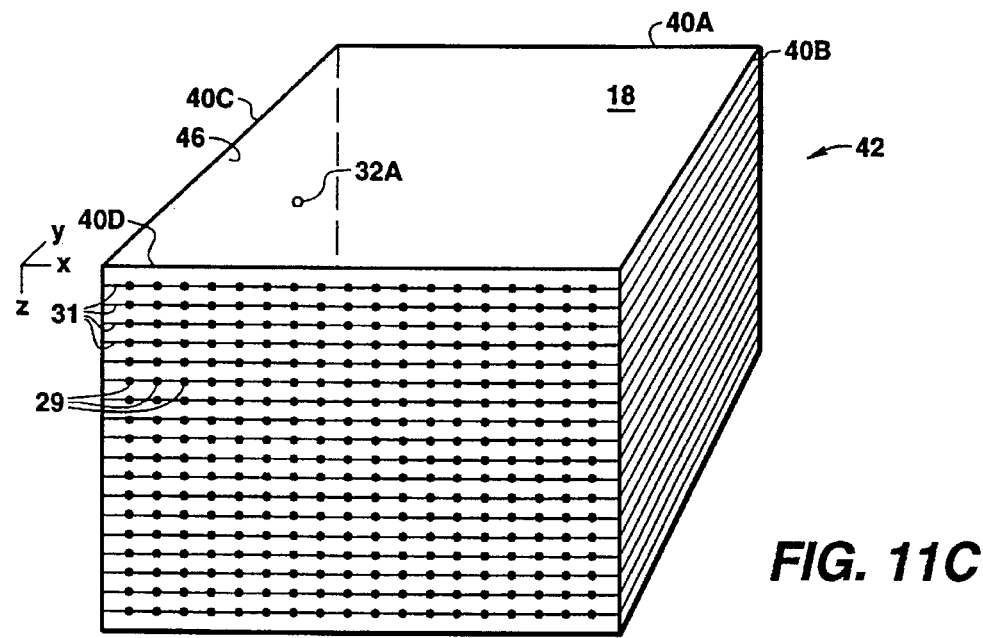
FIG. 11C depicts a perspective view of the traveltime cube of FIG. 11B.

FIG. 11C depicts a perspective view of traveltime cube 42. This cube represents a three dimensional matrix of traveltime values, where each value represents the traveltime from location 32A to a traveltime point 29 on a traveltime slice 31. Note that the term cube is again used generically in this discussion to refer to any three-dimensional volume; for example, traveltime cube 42 will not necessarily be symmetric about surface location 32A. As indicated in FIG. 11C, location 32A is biased slightly towards boundaries 40C and 40D, and slightly away from boundaries 40A and 40B. Because processing computations are not performed outside of the portion of the data acquisition cube which has sources and/or receivers which contribute to the analysis results, traveltimes are not necessary outside of that portion of the data acquisition cube. Therefore, traveltime cubes will also not generally extend outside that portion of the data acquisition cube. In the example of FIG. 11C this constraint on the traveltime data required for data processing leads to the asymmetric positioning of the cube with respect to surface location 32A.

Three dimensional traveltime fields can be calculated for storage using this traveltime slice and traveltime cube structure (72 in FIG. 6) using any one of several techniques known in the art. For example, two-point ray tracing techniques involving raybending or homotopic methods could be used. These techniques evaluate traveltime fields by computing the arrival times from rays from a given surface location to specific subsurface locations. Ray shooting techniques determine arrival times on a regularly spaced grid by interpolation. Eikonal equations solve the wave equation to determine first arrival times from given surface locations. Finally, graph theory search techniques involving Fermat's principle determine the minimum arrival time for all rays leaving a surface location to all points in the subsurface. Each of these techniques will require the analyst to tradeoff calculation speed, accuracy, and robustness, as will be well known in the art. The three-dimensional finite difference solution of the eikonal equation of Schneider in U.S. Pat No. 5,294,325 is a particularly efficient method of determining three dimensional traveltime fields for use in this method. The traveltime fields to be stored may be computed on the MPP, on the host computer, or on any other convenient computer system.

Each traveltime cube extends from surface 18 to basement 19 of analysis cube 20, and includes data from all intervening traveltime slices 31. To minimize the memory burden required to store the traveltime data within the cubes, which are often referred to as traveltime fields, absolute traveltime values are stored only for one wall of a traveltime cube, for example wall 46 in FIG. 11C. Traveltime values for all traveltime points on each traveltime slice throughout the remainder of the traveltime cube are stored as incremental values (74 in FIG. 6). For example, for a traveltime point location whose coordinate reference is X=20, Y=60, and Z=70 ({20,60,70} for short), the absolute value at wall 46 would be stored (reference location {0,60,70}). The traveltime value at {10,60,70} would be subtracted from the value at {0,60,70}, and the difference amount stored at {10,60,70}. The difference between {20,60,70} and {10,60,70} would be stored at {20,60,70}. To compute the absolute traveltime value at {20,60,70} during analysis, the values at {20,60,70}, {10,60,70}, and {0,60,70} would be summed. This method of storing traveltime data in a packed format reduces traveltime storage capacity requirements for the difference amounts by a factor of two, as compared to the capacity requirement for storing absolute values. During analysis, as absolute values are required for computation, the absolute values at wall 46 are determined, and the incremental values unpacked and used to determine the traveltime value at the location of interest within cube During analysis of seismic trace data, the traveltime cubes stored for each traveltime reference location 32 can be directly used to determine by interpolation the necessary traveltimes for any sources and receivers which are located coincident with a traveltime reference location 32. For all other source and receiver locations, a computation is required prior to the interpolation before determining the necessary traveltimes, as follows.

Figure 12:
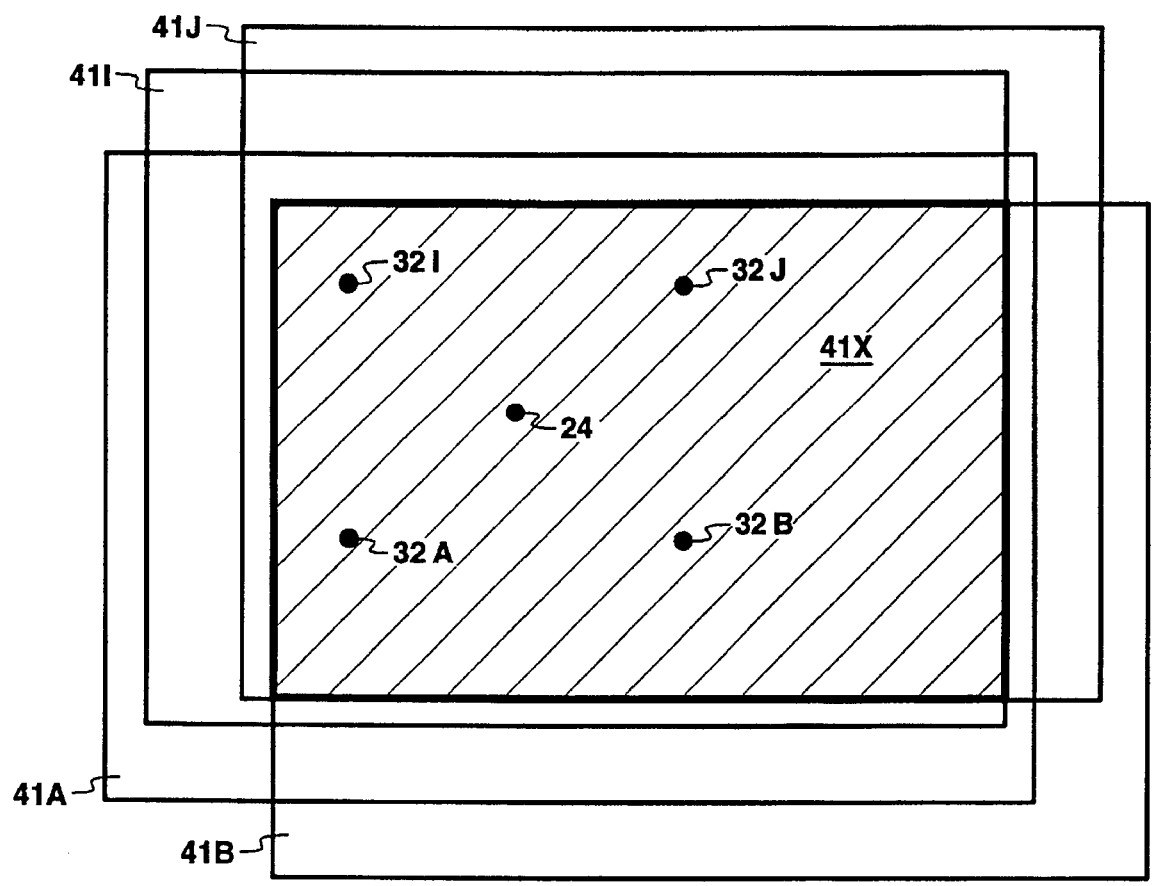
FIG. 12 depicts a plan view of the intersection of the traveltime cubes for four traveltime surface reference locations surrounding a typical source location on the surface of a data analysis cube.

First, the four traveltime surface reference locations 32 nearest to the surface location of interest are determined. For example, FIG. 12 depicts source 24 surrounded by traveltime surface reference locations 32A, 32B, 32I, and 32J. Second, the surface boundaries of the traveltime cubes associated with each of the four nearest traveltime surface reference locations must be determined. In FIG. 12, the cube associated with location 32A is shown as having traveltime surface 41A, location 32B has surface 41B, etc. Third, an intersection region, which is that region common to all four cubes, must be determined. This determination is necessary to facilitate traveltime interpolation. In FIG. 12, for example, crosshatched surface 41X represents the intersection of all four surfaces 41A, 41B, 41I, and 41J. Below surface 41X lies a cube within which traveltime data for the cubes associated with all four surfaces 41A, 41B, 41I, and 41J can be used to determine traveltimes for source 24 by interpolation. Outside that intersection one or more of the traveltime surface reference locations 32 do not have associated traveltime data, and therefore no interpolation can be carried out.

Figure 13:
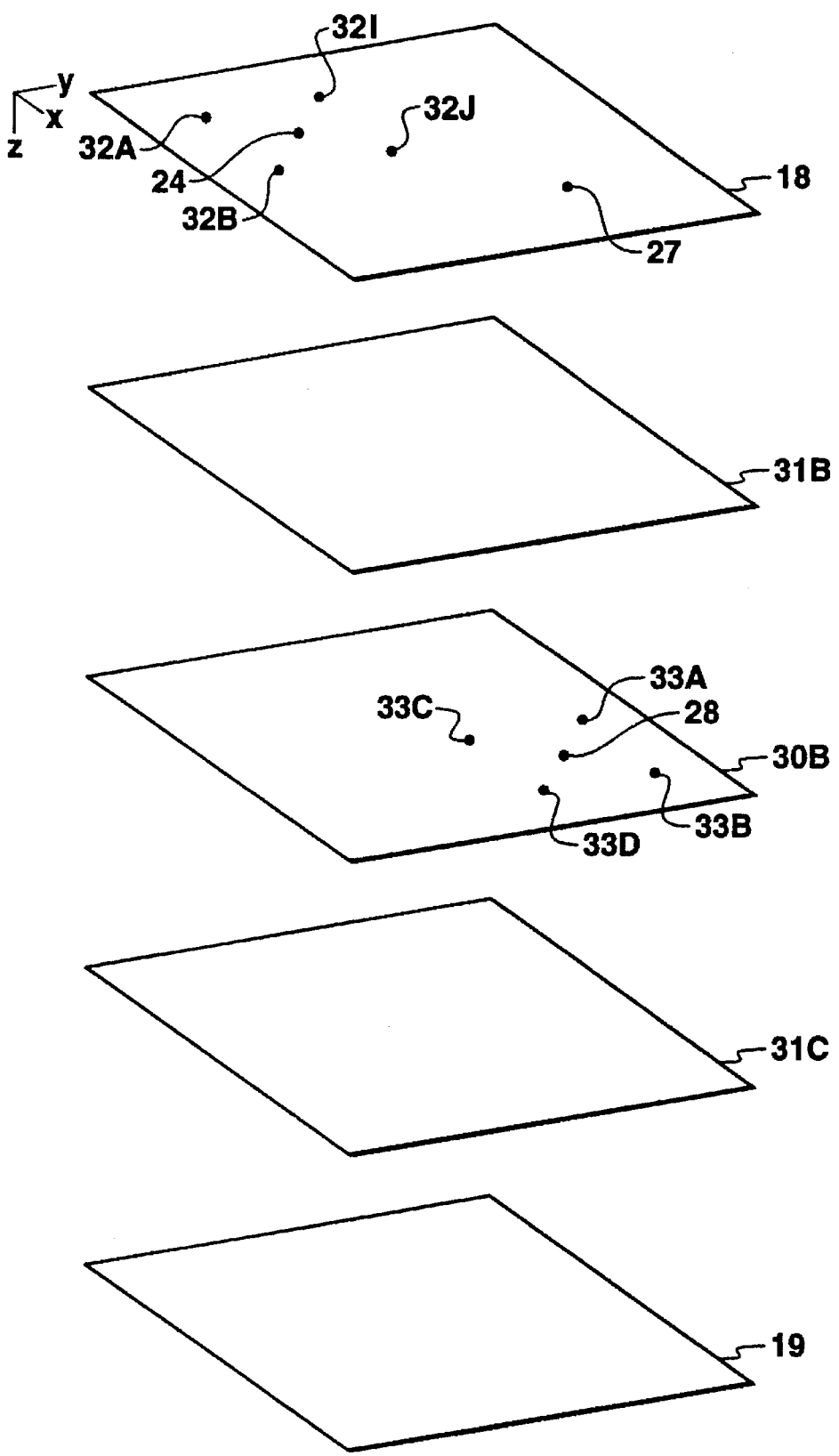
FIG. 13 depicts the exploded perspective view of the analysis cube depicted in FIG. 10, with all but the surface, the basement, two typical traveltime slices and one typical depth slice removed for graphical convenience.

Whether traveltime surface reference location 32 is coincident with the source or receiver location of interest, or the four locations 32 adjacent to that location of interest must be determined (as in FIG. 12 for source 24), an interpolation will generally be necessary to determine the traveltimes to each analysis point of interest within analysis cube 20. One approach taken to perform the interpolation is depicted in FIG. 13, which is a perspective view of analysis cube 20 similar to the perspective view of FIG. 10, except that for clarity only two traveltime slices 31B and 31C and one depth slice 30B are shown between surface 18 and basement 19. For convenience, only one analysis point 28 is shown on depth slice 30B. On surface 18, source 24 is shown as being surrounded by traveltime surface reference locations 32A, 32B, 32I, and 32J. Each of these surface reference locations has an associated traveltime cube (not shown) extending to basement 19 which contains traveltime information to each traveltime point on each traveltime slice. Similarly, receiver 27 is surrounded by four traveltime surface reference locations (not shown) which also contain traveltime information to each traveltime point on each traveltime slice. However, traveltimes on the traveltime slices are not sufficient, rather the total traveltime from source 24 to analysis point 28 and continuing on to receiver 27 is required (This time is commonly referred to as the two way traveltime). The following eight step procedure (FIG. 16) provides one method which can be followed to compute that two-way traveltime. The first seven steps of this procedure involve a vertical interpolation within cube 20 (between slices), whereas the eighth step involves a horizontal interpolation (along a slice).

First, because each surface reference location (i.e. 32A, 32B, 32I, and 32J) is associated with a unique traveltime cube (within the intersection region defined above), each of those locations will involve a unique set of traveltime values on slice 31B. Those four sets of values associated with slice 31B are collapsed in the first step (120 in FIG. 16) to determine an averaged set of values on traveltime slice 31B which represent the times from source 24 to all traveltime grid points on slice 31B. Second, the same procedure is followed to determine an averaged set of values from source 24 to slice 31C (122 in FIG. 16).

The third and fourth steps (124 and 126 in FIG. 16) are identical to the first and second steps, except that the focus is on the traveltimes from the surface reference locations surrounding receiver 27. At the completion of step four of the traveltime procedure, one set of source traveltimes and one set of receiver traveltimes are associated with slice 31B and one set of source traveltimes and one set of receiver traveltimes are associated with slice 31C. These four steps can be performed in any order.

Figure 16:
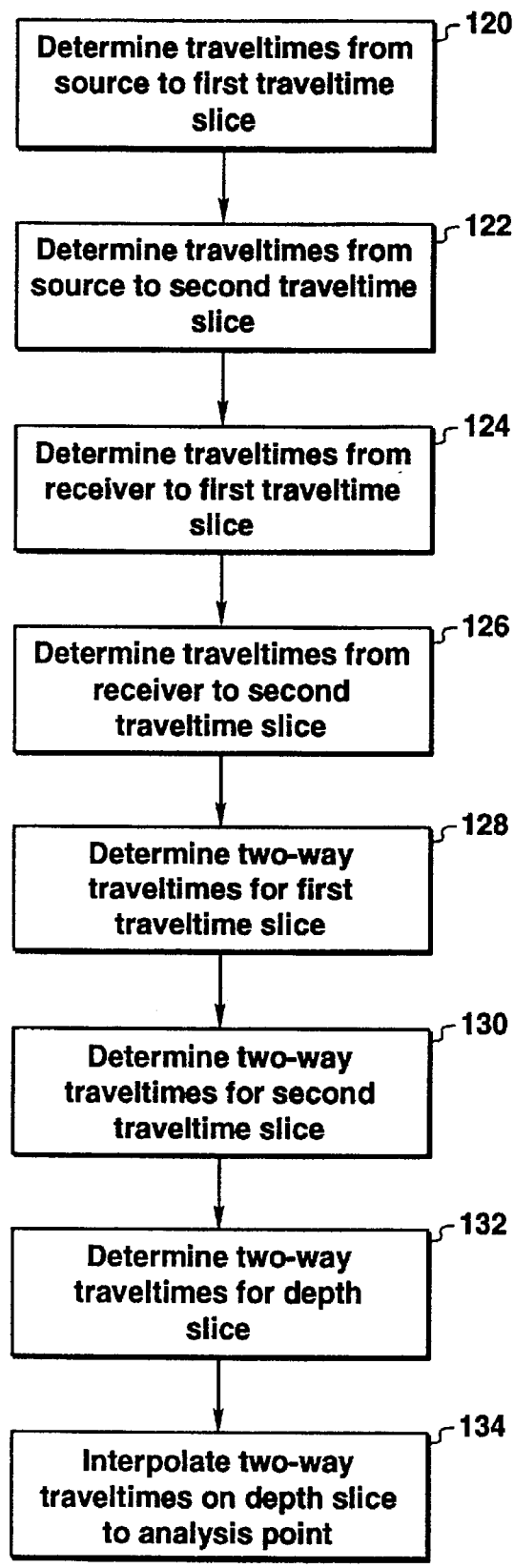

Fifth, the source and receiver traveltimes associated with slice 31B are summed to obtain a single set of two way traveltimes on, that slice (128 in FIG. 16). Similarly, in the sixth step, the source and receiver traveltimes associated with slice 31C are summed to get a single set of two way traveltimes on for slice 31C (130 in FIG. 16). These two steps can be performed in either order.

Seventh, the two way traveltimes on slice 31B are collapsed with the two way traveltimes on slice 31C to obtain a single two way traveltime field for depth slice 30B (132 in FIG. 16). This field only encompasses all points on the traveltime grid, however, which is coarser than the analysis point grid on slice 30B. Therefore, traveltime values will not generally exist at the end of this step for analysis point 28, but rather will only exist for adjacent traveltime grid points 33A, 33B, 33C, and 33D. Eighth, and finally, an horizontal interpolation is performed to obtain the traveltime value for analysis point 28 (134 in FIG. 16). This horizontal interpolation involves two dimensional interpolation procedures, also referred to as bilinear interpolation, which are well known in the art.

As stated above, traveltime cubes are required for each traveltime location 32. These traveltime cubes are stored in files on a fixed line-by-line sequence in high speed traveltime mass storage. Referring to FIG. 3, the files are stored in a sequence extending from the smallest to the largest X coordinate surface locations for each line. The files for each line are stored such that the line for the smallest Y coordinate reference location is the first line transmitted from high speed mass storage to disk storage and thereafter to the local memory of the appropriate analysis PEs. This transmission sequence is discussed further below under Data Processing—Analysis. The advantage of this staged system of high speed mass storage to disk storage to local memory is that each stage has a faster I/O capability than the preceding stage. Overall processing time and cost are reduced if the analysis PEs obtain data from local memory as much as possible, and are only occasionally forced to wait on slower disk and tape I/O transfers. Furthermore, such technologies as high speed tape storage are less expensive than disk storage, thereby leading to the preference for a three stage storage system, as opposed to only a disk to memory system, for example. This three stage storage system is also facilitated by the coarse gridding of the traveltime data, and the fact that the packed format in which the traveltime data are stored reduces overall traveltime data volumes. That packed format also reduces the need to use a heavily decimated traveltime grid which would reduce analytic resolution. Finally, under the MPP functional breakdown discussed above the control PE can operate in a look-ahead mode to ensure that traveltimes are available to the analysis PEs when needed. This use of a control PE to coordinate high speed mass storage-to-disk-to-memory traveltime data I/O is an improvement over the art in that the analysis PEs are not required to perform I/O request functions, which would reduce MPP throughput.

C. Processing Optimization

The third Setup task (FIG. 7) involves determining an optimized sequence for processing the seismic trace data. As indicated above, a significant computation cost and time constraint in seismic data processing derives from the necessity for repeated input and output cycles of trace and traveltime data from tape and disk storage components to the analysis PEs. For example, if the traveltime data that are required to process a specific trace are not available to a PE when necessary, the PE will be unable to proceed with the desired computation until the data is available, thus lowering processing efficiency. The third Setup task optimizes processing efficiency by ensuring that the seismic trace data are stored on tape in an order consistent with the order with which traveltime data will stored, thus maximizing the potential for simultaneous availability of corresponding trace and traveltime data to the analysis PEs.

Figure 14:
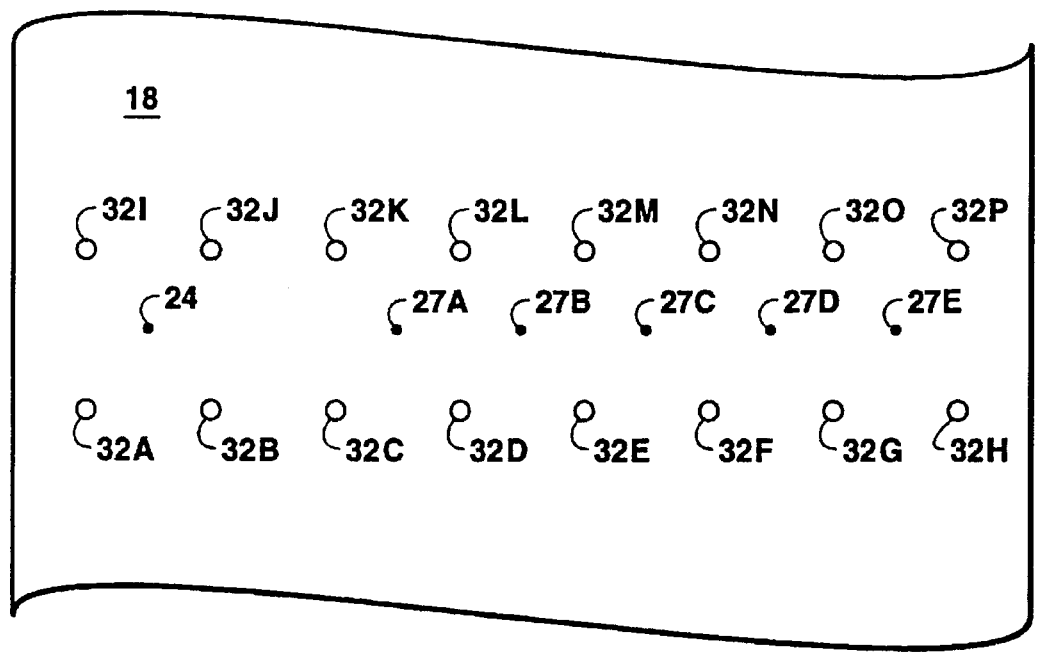
FIG. 14 depicts typical source-receiver offset configurations and adjacent traveltime surface reference locations on the surface of a data analysis cube.

The objectives of the optimization procedure of FIG. 7 can be further described by considering FIG. 14, which depicts an enlarged portion of surface 18 from cube 20. Source 24 and receivers 27A-E are shown, as well as surface reference locations 32A-P which are the traveltime cube surface reference locations nearest source 24 and receivers 27A-P.

As is well known in the art, an individual seismic trace will be associated with each source-receiver pair. For example, source 24 and receiver 27A will have an associated trace (referred to hereafter as trace A), as will source 24 and receiver 27B (trace B), etc. As is also well-known in the art, two way traveltimes for each source-receiver pair are required to analyze the contribution of the associated trace to the image at an analysis point of interest within cube 20 (not shown in FIG. 12). Therefore, source 24 requires the traveltime cubes associated with traveltime surface reference locations 32A, 32B, 32I, and 32J, with receiver 27A requiring the cubes associated with traveltime surface reference locations 32C, 32D, 32K, and 32L. Using these traveltime cubes, the above described interpolation procedure is used to determine the two way traveltime required to analyze trace 27A. Once the trace 27A analysis has been completed, processing may continue with source 24 and receiver 27B, thus requiring traveltime cubes associated with locations 32E and 32M, but no longer requiring 32C and 32K.

The purpose of the procedure outlined in FIG. 7 is to ensure that the seismic trace data is transmitted to the analysis PEs in an optimum order as compared to the fixed sequence in which traveltime fields are stored on the traveltime tapes. This optimization is desired as a result of the relatively large size of the traveltime cubes. To minimize I/O demands (i.e. transfer times) on the tape and disk storage components in FIG. 2, as well as on the local memory of each processor, each traveltime cube should preferably be transmitted to local memory once and all calculations performed as to traces for which that cube is required. The cube can then be overwritten when reading the next desired cube into memory.

An example of this preference can be demonstrated by referring to FIG. 14. Assume, for example, that traveltime cubes associated with locations 32A–D and 32I–L are available in local memory or on traveltime disk. All source-receiver pairs which lie within the region bounded by those traveltime surface reference locations can be analyzed using that traveltime data without a requirement that traveltime tapes be accessed. However, that analysis can only proceed if the seismic trace data for source-receiver pairs within the region defined by those traveltime surface reference locations are also available. For example, Trace A could be analyzed. In contrast, traces B, C, D and E could not be analyzed without access to traveltime tapes, and would therefore be of no use if transmitted to the analysis PEs. If, after computations for trace A are completed, trace B becomes available when the cubes associated with locations 32M and 32E are also available, computations could efficiently continue.

Therefore, the purpose of the procedure outlined in FIG. 7 is to optimize the seismic data trace storage order, since, as discussed above, the large volume traveltime cube data are stored in an invariant fixed sequence. Initially, the seismic trace data is grouped into source-receiver common offset format (76 in FIG. 7). This step will be well known to those skilled in the art. Common offset sorted data offers several advantages to seismic data analysts. First, common offset data can be processed using conventional moveout analysis to correct for errors in the estimate of velocity. This is referred to as residual velocity analysis, and is important because results from such techniques as prestack depth migration are sensitive to velocity errors. Second, data which are processed in common offset order provide an opportunity for interpreters to study intermediate results and/or perform quality control on those results prior to completion of analysis of the entire dataset. For example, if a dataset consists of source-receiver spacings consisting of 100 offsets, the first 10 offsets could be processed and interpretation carried out prior to or simultaneous with the processing of the remaining 90 offsets. Such a capability allows incorrect analyses to be identified early in the analysis phase, thus reducing overall analysis costs, and allowing analyses to be restarted if desired or necessary. Finally, to increase processing efficiency the present method allows multiple common offsets to be simultaneously processed. Therefore, the initial source-receiver common offset grouping allows the subsequent sorting to include simultaneous processing considerations as a sort parameter. This attribute of the present invention of simultaneous multiple offset processing is an improvement over prior art methods which reduces traveltime recalculation requirements and lessens the traveltime I/O bottleneck.

Thereafter, the coordinates of each of the surface locations of all sources 24 and all receivers 27 are extracted from the seismic trace data (78 in FIG. 7). This extraction is merely of surface coordinates in {X,Y} format (Z=0 on surface 18); no actual seismic trace data is required.

Next, a sorting of the coordinates is performed to develop sequences of source clusters of the coordinates (80 in FIG. 7). Source clusters, for example, may be considered to be sources 24 on surface 18 having one or more common traveltime surface reference locations, or having two way traveltimes to receivers 27 which may themselves have common traveltime surface reference locations which can be clustered. The clusters may also involve groups of traces having common sources. Generally, the sort focuses first on narrow ranges of common offsets, which are those source-receiver pairs which are relatively closed spaced, with larger ranges of offsets progressively considered thereafter. For example, if a dataset consists of source-receiver spacings consisting of 100 offsets, the offsets could first be subdivided into groups of roughly 20 offsets each. Within each group, the clusters would be sorted based first on relative locations of the sources to each other, and next on relative location of the receivers to each other. Each group would be sorted using a generally similar procedure, and offsets would not generally be sorted between groups. In addition, the sort would include consideration of the multiple common offsets to be simultaneously processed. Multiple offset processing facilitates early interpretation of output results (while additional offsets are being processed), which aids error identification and lowers overall costs.

The sorted order initially input to the simulation may also rely on an actual or assumed shot order of the seismic data. For example, in FIG. 3, the order may begin at origin 15 of the coordinate system with the first shot line (i.e. from {0,0,0} through {Xmax, 0,0}, where Xmax (not shown) is the maximum X coordinate system value on the surface of the data acquisition cube), and proceed thereafter with the second shot line, the third shot line, and so on. Within that order the X and Y values of both sources and receivers would be retained in the simulation.

The sorted coordinates form the input to a data analysis simulation which is performed by the host computer (82 in FIG. 7). The simulation uses the extracted coordinates to reproduce the sequence of actions which the components of the MPP system would follow to obtain seismic trace and traveltime data if that data were actually input to the analysis PEs in the order determined by the sort, but does not include actual seismic calculations. The large size of the traveltime fields leads to the preference discussed above that those fields be stored in a rigid sequential structure, and therefore the dependent variable in the simulation is the order in which the seismic traces are made available to the analysis PEs. That dependent variable is in turn a function of several parameters which may be varied by the analyst to determine the optimized storage order of the seismic traces. These parameters include the number of traveltime lines which can be stored on disk after being read from tape, the amount of memory available for the analysis processors to retain traveltime data once read from disk, the number of offsets which are to be simultaneously processed, and the number of analysis PEs in the MPP system. Other parameters will be apparent to those skilled in the art.

The output of the simulation allows statistics to be computed which quantify the processing efficiency of the sorted sequence (84 in FIG. 7). The statistics focus generally on the frequency with which traveltimes must be read from tape to disk or from disk to memory for an analysis to be carried out, on the number of times that traveltimes can be reused from one trace to the next for processing, and on the number of times traces must be skipped (i.e. have analysis delayed due to unavailable traveltimes). These optimization statistics are reviewed to determine the relative efficiency of the input sorted order (86 in FIG. 7). If further optimization is desired, the simulation can be repeated using an adjusted sort criteria (88 in FIG. 7). The adjustment may involve regrouping of offsets, reclustering of sources or receivers, or adjustments to any of the other parameters used in the sort or the simulation.

Once acceptable simulation statistics are obtained, the host computer proceeds to sort the seismic data and re-store that data on data tapes in the sorted order (90 in FIG. 7). Thereafter, the host computer transmits the sorted data from data tape to the data disks for subsequent transmission to the MPP during the Analysis phase.

In a preferred embodiment of the present method, all traveltime data are initially stored on high speed mass storage, such as high speed traveltime data tapes. To facilitate traveltime data accessibility to the MPP, approximately the first twenty lines of traveltime data are transmitted to traveltime disks upon commencement of the method. The exact number of lines transmitted will depend on the nature of the analysis, the data involved, and on the capabilities of the MPP system being used, i.e. traveltime disk capacity. The optimization then focuses on the source-receiver pairs within that twenty line region. During this optimization, as new traveltimes are required, the least recently used of the traveltimes which then reside on disk or in local memory are overwritten.

The result of the tasks in the Setup phase of the present method is an analysis domain in which each component— the analysis cube, the traveltime data, and the seismic trace data—has been structured to facilitate efficient processing in the Analysis phase. The effectiveness of the Setup phase relies not only on the unique functional breakdown of the MPP system of the present method, but also builds on that breakdown by simplifying and optimizing the data handling associated with each component. As described further below, this effectiveness provides significantly improved MPP throughput as compared to the prior art.

IV. Data Processing—Analysis

The Analysis phase of the present method is depicted in FIG. 8. Upon completion of the Setup phase, the traveltime fields are stored in packed format on the high speed mass storage system. The seismic trace data are stored on data tapes in the optimized sort sequence described above.

Initially, the control PE transmits functional assignments and the dimensions of the analysis cube, the traveltime fields, and the aperture region to both the I/O and the analysis PEs (91 in FIG. 8). Each I/O PE then constructs a table defining the assignments of traveltime slices to analysis PEs. This table is relied on by the I/O PEs whenever additional traveltime fields are to be transmitted to the analysis PEs, as further described below. The analysis PEs also construct a table defining the assignments of traveltime slices to analysis PEs, and in addition construct a table defining the assignments of depth slices to analysis PEs. Data included in both of these tables are required by each analysis PE during subsequent steps in the Analysis phase. Although each analysis PE only requires knowledge as to the specific traveltime and depth slices assigned to that analysis PE, construction of these tables is neither costly nor time demanding, and therefore each analysis PE constructs the tables for the entire analysis cube. Thereafter, each analysis PE focuses only on the traveltime and depth slices for which that analysis PE is assigned analysis tasks. Finally, each analysis PE performs any aperture dimension calculations which may be necessary. If aperture dimensions are input in functional or tabular form, a calculation for each depth slice will be required. However, if the dimensions are precomputed for each depth slice, no such calculation will be required once the dimensions are received from the control PE.

Next, in the sorted order sequence described above, seismic trace data are transmitted to the local memory of each analysis PE (92 in FIG. 8). The data are transmitted from tape to disk by the host computer upon the command of the control PE. The host may transmit only a portion of the data from the sorted order to the disks. Alternatively, the sort may be based on an assumed number of offsets to be simultaneously processed. If fewer offsets are to be simultaneously processed, the host will not transmit the undesired offsets to disk.

The control PE then broadcasts that data from disk to each analysis PE in blocks of traces. The number of traces in the blocks will vary with the nature of the analysis cube and of the dataset being analyzed, as well as with both the block size constraints of the tape system being used and the I/O communication constraints of the control PE. For example, large blocks consume significant amounts of memory on each PE, decreasing the memory available to the traveltimes or analysis cubes. On the other hand, relatively small block sizes less efficiently use the available input/output transmission capability of the MPP system. In one embodiment of the present method, block sizes of 512 traces have been found to provide a suitable balance of these considerations. However, the block size in other embodiments of the present method must be determined by the analyst based on available memory, the size of the slices involved, and the size of the overall seismic trace dataset, among other factors which will be known to those skilled in the art.

The broadcast of traces to the analysis PEs may rely on any convenient MPP library broadcast routine, using any or all available communication channels within the MPP, because I/O of the seismic trace data is typically not an I/O bottleneck of the MPP. This attribute of the trace data simplifies data transmission, and derives from a number of characteristics of the present method. First, the depth slice decomposition of the analysis cube allows each analysis PE to operate independently of other analysis PEs, thereby avoiding the need to pipeline data through a sequence, also referred to as a pipeline or a chain, of analysis PEs. This is an improvement over such prior art as U.S. Pat. No. 5,198,979 issued to Moorhead, Gregg, and Tolle which requires a seismic trace data pipeline approach. In that method each individual processor must complete processing as to a trace before the trace is transmitted to the next processor in the pipeline. That method delays processing by subsequent processors in the pipeline, a limitation avoided by the present method. Second, the use of the I/O PEs to transmit traveltime data to analysis PEs ensures traveltimes are available to all analysis PEs when necessary, thereby facilitating simultaneous analysis PE processing. Other techniques of transferring the traveltime data to analysis PEs must ensure traveltimes are available to the analysis PEs in the proper sequence, a complication eliminated by the present method. And finally, in the present method the trace data are read only once, thus avoiding both the need to reread trace data which would thereby require specialized trace data transmission procedures and the need to inefficiently reread the larger traveltime fields, which would create traveltime data transfer bottlenecks.

In addition to the above, the present invention offers additional advantages if a broadcast routine referred to as logarithmic fanout over a tree is implemented. This approach takes advantage of the interconnect network in the MPP which connects the control PE with the analysis PEs. In one embodiment, the fanout is configured as a binary tree, as follows. The control PE, acting as a parent PE, sends the trace block to two analysis PEs, acting as the parent PE's children, then these two PEs send the trace block to each of two other analysis PEs, each of whom then send the trace block to each of two other analysis PEs, etc. This process continues until all PEs have the trace block, with the result that the control PE and the analysis PEs are connected in parent-child relationships which visualize into a binary tree hierarchy. The binary tree configuration follows a base two logarithmic sequence in that the logarithm of the number of PEs which have the trace block at any step is a power of two. Similarly, a base three logarithmic fanout would involve sending the trace block to a group of three PEs, a base four to a group of four PEs, etc. This fanout approach is configurable and can take place in any logarithmic base, up to the limiting case of a direct placement broadcast option in which the control PE acts as the parent to all analysis PEs, in which case the tree has a depth of one, i.e. all trace block transmissions are completed in the first step.

One advantage of the fanout over a tree approach is that the placement of the analysis PEs in the tree may be configured as a function of the computational load placed on the analysis PEs. As discussed above in conjunction with the final step of the first Setup task, the manner in which depth slices are assigned to the analysis PEs will sometimes result in certain analysis PEs having a heavier analysis load than other analysis PEs. Therefore, the fanout over a tree approach presents the opportunity to place PEs with a heavier computational load near the bottom of the tree, farther away from the control PE, thereby lessening the likelihood that the heavier computational load may delay the delivery of seismic traces to other analysis PEs.

As will be well known to those skilled in the art, a variety of data preprocessing procedures will often be applied to the seismic trace data prior to final analysis. These preprocessing procedures, which include muting, filtering, anti-aliasing, deconvolution, automatic gain control, and other procedures may be applied to the data in the host computer, as it is transferred to local PE memory, or immediately thereafter. As will also be understood, a constraint to performing trace data preprocessing in the host computer is that the preprocessing computation to be performed must involve identical computations for all depths and that the computation can be performed in the time domain. The advantage of performing preprocessing in the host computer is that the seismic trace data is preprocessed once, and each analysis PE thereafter receives the preprocessed data. Preprocessing in the analysis PEs is less efficient because each analysis PE would be performing identical preprocessing procedures even though the procedures are independent of depth slice location. However, if a preprocessing procedure will vary from depth slice to depth slice, the procedure must be performed in the analysis PE since the host computer in the present method does not retain depth slice information.

For those preprocessing procedures which do not vary between depth slices, the use of a control PE in the present method leads to a third option—that of performing at least a portion of the preprocessing in the control PE. Increased efficiency occurs under this option due to improved communications throughput between the components of the MPP system, as demonstrated by reference to FIG. 2.

As discussed above, seismic trace data are transmitted from data tapes (102) to data disks (106) by the host computer (112), and from data disks (106) to the analysis PEs by the control PE. Although the host computer is preferably a high-speed computer system, the communications capabilities of the processing elements in the MPP system will typically be greater than the capabilities of the host. As will be understood to those skilled in the art, communications capabilities include both the speed at which data is transmitted, either input or output, and the latency, defined as the communication startup time, to initiate a transfer. More data can generally be transmitted more quickly from the control PE to the analysis PEs than can be transmitted from tape to disk by the host, or could be transmitted from the host to the control PE. Therefore, by shifting a portion of the data preprocessing from the host to the control PE, the present method optimizes the use of the capabilities of both the host and the control PE, with a resulting increased data processing throughput for the entire MPP system as compared to the case where all preprocessing is performed in the host. In the present method, therefore, in association with the transmission of the seismic trace data to the local memory of each analysis PE (92 in FIG. 8), both the host computer and the control PE perform data preprocessing. As will be understood to those skilled in the art, embodiments of the present invention exist in which the host performs no data preprocessing.

In addition to the above, the added complexity of certain preprocessing procedures particularly lend themselves to being carried out on the control PE. For example, anti-alias filtering is a procedure frequently employed to increase the quality of migration results. Aliasing in seismic trace data can cause steep dips to be incorrectly migrated, with the resulting errors often being a function of range in the output seismic section. An undesired noise component may also be introduced into the section.

One way to minimize or eliminate aliasing errors is to filter the trace data, usually with a lowpass filter. However, because aliasing error may be a function of dip steepness and range, the same lowpass filter cannot generally be applied to the data to be migrated for all depth slices or all ranges. Instead, separate filters with individually specified cutoff frequencies may be required to process the trace data. The result is that a single input trace is expanded into several filtered versions of that input trace, each of which must then be transmitted to the correct analysis PEs for the subsequent analysis. This characteristic of anti-alias filtering, sometimes referred to data expansion, therefore increases the MPP system's data transmission burden. Because the control PE has higher data communications capabilities than the host, anti-aliasing procedures are more appropriately performed on the control PE, which can then transmit the filtered versions of the input trace directly to the analysis PEs. If such procedures were performed on the host, the expanded data would need to be transmitted to the control PE, and thereafter to the analysis PEs, increasing the overall data transmission load and resulting in a less efficient allocation of MPP system resources. In the present method, therefore, both the control PE and the host perform data preprocessing, with the control PE primarily performing data expanding types of preprocessing, such as anti-aliasing, and the host primarily performing other non-expanding procedures, such as automatic gain control and muting. As will be understood to those skilled in the art, data preprocessing requirements vary between datasets and analytic goals, and, in association with this primary allocation of preprocessing procedures, other data preprocessing procedures will be allocated between the control PE and the host based on the processing effort involved, taking into account the respective communications capabilities.

The analysis PEs process each trace independently of other traces and independently of other PEs. Processing as to each slice proceeds for each trace as follows. First, the analysis PEs receive the necessary traveltime fields for the data trace (93 in FIG. 8). Using the contiguous group of depth slice assignment approach exemplified in Table 1 and FIG. 13, each analysis PE will require traveltime data from two traveltime slices from each of a maximum of eight traveltime cubes. In practice, the analysis PEs will have a portion, and sometimes all, of the necessary traveltime data resident in local memory. The extent to which additional traveltime data will be required, or existing traveltime data in local memory will be sufficient, will depend on the outcome of the optimization procedure. Generally, the processing optimization should typically result in an average of not more than three new traveltime cubes to be loaded for each new analysis to be performed on a new data trace.

When traveltimes are to be obtained from traveltime tape, the control PE sends a request to the host computer to transfer a complete line of traveltime data from traveltime mass storage to disk in full traveltime cube format. However, the I/O PEs control transfer of traveltime data from disk to local memory. Each I/O PE may transmit traveltime fields to all analysis PEs, using the assignment table constructed above, although each analysis PE is only transmitted the traveltime slice data required for analysis of the depth slices assigned to it. The control PE maintains a memory map of the traveltimes stored in local memory of each analysis PE, as well as of the traveltimes then resident on each traveltime disk. That memory map is used to continually request the host computer to transmit traveltime fields from tape to disk, and to request the I/O PEs to transfer traveltime fields from disk to analysis PE memory, thereby minimizing analysis PE downtime which would result from unavailable traveltime data.

The transmission of traveltimes to analysis PEs follows a bucket brigade approach that relies on the above assignment tables and that can be simply described by referring to Table 1. Assume for example that an I/O PE is to transmit a new traveltime cube to the analysis PEs. Traveltime slice number one (TTS1) is transmitted to analysis PE number one (PE1). Traveltime slice number two (TTS2) is transmitted to analysis PE number one (PE1), which then transmits that slice to analysis PE number two (PE2). Traveltime slice number three (TTS3) is transmitted to analysis PE number two (PE2), which then transmits that slice to analysis PE number three (PE3). This process continues for all traveltime slices and all analysis PEs, and is independently performed by each I/O PE, whenever traveltime data are required in analysis PE memory.

Other methods of transmitting the traveltimes to the analysis PEs may also be employed. For example, a direct scatter approach may be used in which the I/O PEs directly transfer traveltimes to all appropriate analysis PEs. That approach is sometimes referred to as a card shuffle approach. Another approach which may be employed is referred to as a fanout, or logarithmic/binary transmission approach. In this approach, an I/O PE will transmit traveltimes to an analysis PE, both the I/O PE and the analysis PE will transmit the traveltimes to two additional analysis PEs, all four PEs then transmit to four additional PEs, and so on. All PEs in the fan thereby continue to transmit traveltimes to other members of the fan until all members have the necessary traveltimes. This approach increases traveltime transmission throughput, but at the constraint of limiting analysis PEs to I/O-type tasks until the traveltime transmission is completed. This method is furthermore not limited to a number of PEs equal to a power of 2, as the last stage may involve transmission from a portion of the participating PEs. The approach may be most appropriate where the depth slice assignments are widely dispersed across the analysis PEs (i.e. not involving the contiguous groups of depth slices assignment approach). Other transmission approaches will be apparent to those skilled in the art.

At the completion of steps 92 and 93 in FIG. 8, the local memory of each analysis PE contains both seismic trace data and traveltime field data. Each type of data will be stored in analysis PE local memory buffer pools dedicated to that type of data. The use of dedicated memory buffers leads to an additional advantage of the present method which is of particular benefit in MPP systems such as the Cray Research T3D system. As will be understood to those skilled in the art, each PE in the T3D has the ability to directly access memory on other PEs. This capability, which is not a characteristic of all presently available MPP systems, provides a basis from which the present method may asynchronously optimize data and traveltime transfer to the analysis PEs.

As discussed above, seismic trace data and traveltime data transmission to the analysis PEs is controlled by commands from the control PE. The control PE commands are the result of a look forward to upcoming analysis tasks, which is performed to ensure that appropriate trace and traveltime data are simultaneously available when required by the analysis PEs. In doing so, the control PE may monitor either the trace or the traveltime buffers, or both, to determine an appropriate time to transfer the additional data. That appropriate time occurs at or before the time at which no further analysis tasks remain for previously stored seismic trace data or traveltime fields. The portion of the memory buffers in which that previously stored data is located is then available for receiving the data required for upcoming tasks.

This monitoring approach to trace and traveltime data transfer timing can be implemented in any of several embodiments. In one embodiment, the control PE monitors all buffers of all analysis PEs, both trace data and traveltime data, and initiates the transfer of either trace or traveltime data whenever sufficient buffer space is available for that type of data. A disadvantage of this approach is that the control becomes a bottleneck in the transfer process, since the data transfers, which occur in a sychronized sequence, cannot begin until sufficient analysis PE buffers are available.

In a preferred embodiment which minimizes the need for synchronization, these monitoring responsibilities are correlated with the parent-child broadcast hierarchy discussed above. In this embodiment, each PE monitors the buffers of its children. For example, in the binary tree example discussed above, the control PE monitors the buffers of its two children, each of those PEs monitors the buffers of its children, and so on throughout the tree. An advantage of this embodiment is that each PE's monitoring responsibilities are limited to only those other PEs with which it directly communicates, thereby minimizing the overall monitoring effort required by each PE, and allowing communications between parent-child pairs to occur with a maximum degree of asynchronization.

The I/O PEs may perform a similar traveltime buffer monitoring function. For example, if the direct scatter traveltime approach discussed above is employed, each I/O PE will directly communicate with each analysis PE. In this approach each I/O PE receives different sets of traveltimes from the traveltime disks after the control PE sends the required command for the transfer of traveltimes to the I/O PEs. Each I/O PE is then assigned a dedicated buffer from the pool of buffers in each analysis PE. The I/O PEs monitor their assigned buffers, and initiate traveltime data transfer when those buffers are available for receipt of additional traveltime data. This process then repeats for the next traveltimes to be transferred, with the I/O PE again being assigned a dedicated buffer, which may or may not be the same buffer assigned for the previous transfer. If the traveltimes are transmitted using a bucket brigade, hierarchical tree, or other approach, then the analysis PEs may also be assigned parent-child traveltime buffer monitoring responsibilities, as discussed above.

An additional advantage of the present method is that the analysis PEs may also perform a self-monitoring function as to the trace and traveltime buffers. This self-monitoring function takes advantage of the two-way message passing capabilities of MPP systems such as the T3D. In this function, in addition to an analysis PE's monitoring of the availability of buffers in each of its children, each analysis PE transmits a message to its parent PE whenever it has buffer space available to receive additional data. For example, the analysis PE will transmit a message that it has trace buffer space available. That message acts as a "green light" for the parent PE to transmit additional trace data to the child. Depending on the broadcasting routine being used, the parent PE may immediately respond or may wait until "green lights" have been received from a prespecified number of its children before initiating the trace data transfer.

Similarly, the analysis PEs will also transmit messages to the I/O PEs that the traveltime buffer has space available for additional traveltime data. As above, depending on the method being used to transmit the traveltimes to the analysis PEs, the I/O PEs may immediately respond to the "green light" or may delay until a prespecified number of "green lights" have been received.

The advantage of buffer control through this two-way message passing characteristic of the present method is that the analysis, the I/O and the control PEs all work together more efficiently by reducing or eliminating instances when the processing by the analysis PE is delayed until additional trace or traveltime data is available to it. As a result, the processing workload on the analysis PEs is more efficiently carried out. In addition, the management of the PE buffers using the "green light" approach allows the parent PE to incur more of the data transmission burden than is incurred by its children. Specifically, the green light approach allows the parent PE to asynchronously deliver data to the children PE's buffers by using write commands. Without the green light approach, the children would be forced to read data into those buffers, and as will be understood to those skilled in the art, read tasks are more time consuming to perform in many computer systems, and therefore reduce a PE's ability to focus on the analytic workload to be carried out. In addition, the use of write commands places the data transfer responsibility on the PEs higher up the tree (i.e. on the parents, as opposed to on the children). As discussed above in conjunction with the computational load distribution benefits of the fanout over a tree aspect of the present invention, the parent PEs will generally have a lower computational load than the children, and therefore are preferably assigned that transfer responsibility.

The above buffer monitoring and two-way message passing characteristic of the present method preferably involves the specification of the size of the local memory buffer pool prior to the initiation of an analysis. Although a fixed buffer pool size could be specified and not changed from one analysis to the next, the present method is most efficiently implemented if the analyst specifies the buffer pool size as a function of the analysis to be performed. For example, for a 128 PE MPP system using a binary fanout tree, one implementation of the present method constrains the analysis PE with the heaviest computational load and the analysis PE with the lightest computational load to be processing individual traces which are not separated by more than about seven or eight traces with respect to the sequence in which the traces are downloaded from data disk. In that example this requires that seven or eight buffers be dedicated to trace data in each analysis PE. By limiting the number of traces which separate the processing being performed by the analysis PEs, which themselves will be separated by no more than about seven levels in the binary fanout tree hierarchy, the transfer of trace data and traveltime data throughout the MPP can be efficiently managed. As will be understood by those skilled in the art, however, the size and number of these buffers will depend, in addition to the capabilities of the MPP system to be used, on several parameters of the data to be processed, for example, the length in seconds of the traces, the number of amplitude samples in the traces, the number of preprocessing filters being used, etc., as well as on the processing effort being performed. These parameters will generally be known prior to the commencement of an analysis, and therefore allow the present method to be configured in advance to optimize buffer size and number for the broadcast routine to be used.

Once specified, the trace data broadcast sequence will generally be initiated as follows. First, the control receives a sufficient number of new traces to fill the trace data buffers in its children. As indicated above, this will generally involve seven or eight traces. The control will preprocess those traces, if necessary, and will then download those preprocessed traces to its children. If a hierarchical tree broadcast routine is implemented, those children will then broadcast the traces to their children, and so on. The control PE will then obtain a new trace and preprocess it, but will not transmit that trace to its children until a buffer is available to receive it. The control PE will continue to monitor buffer availability until the trace can be broadcast, which occurs asynchronously of other tasks being performed by the child PE, and the process then repeats. As indicated above, the child PE will also send a "green light" message back up to the control as the child's buffers become available. This process occurs in all parent-child pairs in the hierarchy for the entire analysis of all the trace data.

The transfer of traveltime data from the I/O PEs to the analysis PEs follows an analogous sequence to the trace data broadcast, including the buffer monitoring and "green light" messaging. Of course, the I/O PEs have no traveltime data preprocessing duties to perform.

Next, the traveltime data are unpacked and interpolated (94 in FIG. 8) over the region of intersection of the traveltime cubes. In the preferred embodiment of the present method, the Analysis phase proceeds only over the intersection region. However, analysis may also proceed, if desired, over those portions of the analysis cube for which less than four traveltime cubes have available data. The suitability of proceeding to those portions will depend on the relative rate of variation of traveltimes in space which will be dataset dependent. In such a case, the above interpolation procedure will need to be suitably modified, as will be apparent to those skilled in the art.

Note also that the present method is not limited to the staged access of traveltime data from high speed mass storage to disk to local memory procedure described herein. An alternate embodiment allows use of a layered, laterally constant velocity model when such a simple model is desired. In this embodiment, the layered model is transmitted to the I/O PE's, which then calculate the necessary traveltimes and transmit those traveltimes to the analysis PEs. Alternatively, the layered model may be stored in analysis PE local memory, where traveltime calculations are performed when necessary. In that alternative, no I/O PE's would be required in the MPP. In both of these alternatives, neither high speed mass storage nor traveltime disks would be required. Finally, other embodiments of the present method, such as on the fly calculation of traveltimes relying only on data stored in disk storage, will be apparent to those skilled in the art.

In a preferred embodiment of the present method, the unpacking and interpolation procedures are performed by dual instruction calculation routines which exploit the capability certain processing elements have of initiating more than one operation in a single clock period. For example, both the Intel 80860 and the Digital Equipment Alpha microprocessors offer this capability. The advantage of this dual instruction calculation methodology is that, by using an appropriate coding style, one integer and one floating point operation can be initiated in a single clock period, whereas two clock periods are required if both operations are in floating point format. An additional benefit of microprocessors incorporating such architectures as the Digital Equipment Alpha architecture is that integer operations are more quickly completed by the microprocessor than are floating point operations. This benefit derives from the microprocessor's shorter internal pipeline for integer operations as compared to the internal pipeline for floating point operations, as will be understood by those skilled in the art. As a result, with use of an appropriate coding style an approximately two-fold increase in overall calculation speed can be obtained.

Figure 15:
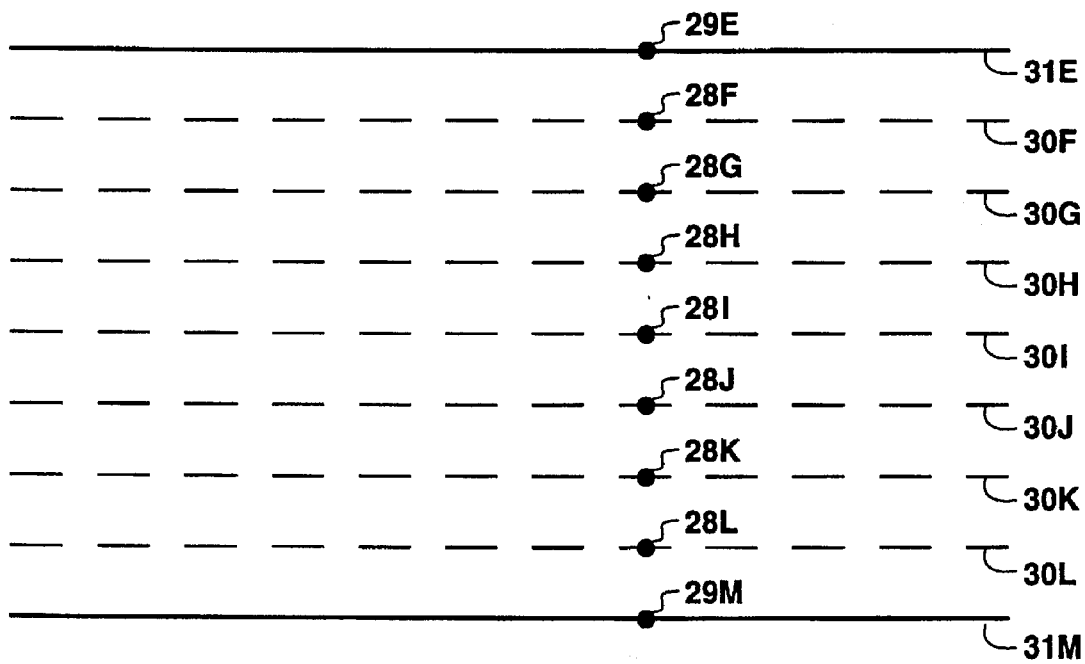
FIG. 15 depicts typical analysis and traveltime grid point locations on depth and traveltime slices, as are involved in vertical traveltime interpolation.

The coding technique achieves this improved calculation performance by replacing floating point operations by equivalent integer or bit manipulation operations. By way of example, but not to be limiting, FIG. 15 can be used to demonstrate this coding technique. FIG. 15 depicts two consecutive traveltime slices, 31E and 31M, from cube 20, and seven intervening depth slices 30F-L. For convenience, only traveltime grid points 29E and 29M and analysis grid points 28F-L are shown. Note also that analysis grid points (not shown) will occur coincident with traveltime grid points 29E and 29M.

One purpose of the overall seismic data analysis procedure is to compute the contribution each seismic trace makes to an output variable at each analysis point. The procedure to be followed, as is well known, will first require the determination of the two-way traveltime associated with each source-receiver pair (not shown) with each analysis point, and, second, use that two-way traveltime to determine each trace's contribution at that analysis point. However, as discussed above, traveltimes are only stored for traveltime grid points 29E and 29M. Thus traveltime interpolation is required. It is the interpolation procedure which can take advantage of the dual calculation capability of the processing elements.

In the simple example of FIG. 15, the traveltime interpolation required for analysis point 28F may be written as follows:

$$t(28F)=c(f)[t(M)-t(E)]+t(E) \tag{1}$$

where t(E) is the two-way traveltime associated with traveltime point 29E, t(M) is the two-way traveltime associated with traveltime point 29M, c(f) is an interpolation constant, and t(28F) is the interpolated two-way traveltime at analysis point 28F. Assuming a linear interpolation technique, for example, c(f) would be equal to 0.125. Slightly restructured, equation (1) may be written as:

$$t(28F)=[1-c(f)]t(E)+c(f)t(M) \tag{2}$$

Once this traveltime interpolation has been completed, an analysis step must be performed. That analysis step can be generically represented as follows:

$$x(28F)=x'(28F)+y[Int\{t(28F)\}] \tag{3}$$

where x(28F) on the left hand side of (3) is the output variable at point 28F, and is the sum of (a) the variable x' (28F), which is the output variable resulting from all previously analyzed traces and (b) the contribution from trace y (a trace presently being analyzed) at time t(28F). The "Int" operation associated with trace y is a conversion from floating point to integer format required since the indices of array variables must be in integer format. This analysis step will be known to those skilled in the art.

As will also be apparent to those skilled in the art, equation (2) requires a total of four floating point operations, and equation (3) requires one integer and one floating point operation. Because each successive operation depends on the previously performed operation, thus eliminating any opportunity for relying on the dual operation capability of the processing elements, this direct coding style will typically involve six consecutive operations by the analysis PE. (Consecutive is intended in this discussion to mean consecutive calculation-type operations, and does not include other operations the microprocessors may be required to make to perform those calculations, such as load and store operations necessary to place the desired data in the appropriate internal registers as required to perform the calculations. The requirement that such other operations will be performed by the microprocessor will be understood to those skilled in the art). In contrast, an integer-oriented coding style could complete the same analysis in substantially fewer consecutive operations. This coding style benefits not only from the above described capabilities of the processing elements, but also from a combination of attributes uniquely associated with the depth slice and traveltime slice decompositions described above.

Note in FIG. 15 that depth slices 28F-L divide the region between traveltime slices 31E and 31M into eight intervals. As a result, the interpolation constants for each depth slice, presuming a linear interpolation technique, are multiples of 0.125 (⅛). For example, the interpolation constant for slice 28F would be C(f)=0.125 (⅛), for slice 28G would be C(g)=0.25 (2/8), C(h)=0.375 (3/8), and so on. Thus, equation (2) can be written:

$$t(28F)=[1-0.125]t(E)+0.125t(M) \tag{2'}$$

and the analogous equation for slice 28G is:

$$t(28G)=[1-0.25]t(E)+0.25t(M) \tag{4}$$

Note, however, that equation (4) can also be rewritten as:

$$t(28G)=t(F)+[t(M)-t(E)]/8) \tag{4'}$$

Therefore, the incremental interpolated time for each succeeding analysis point 28G, 28H, 28I, etc., is a linear multiple of 0.125 (⅛), as given by the latter term in equation (4'), with that increment added to the time associated with the preceding analysis point, i.e. t(28F) in equation (4'). In floating point calculations, an interpolation procedure involving multiplications by multiples of 0.125, alternating with summations such as in (4'), thereby results.

However, if integer calculations are used, the same interpolated time increment can be obtained by using an integer arithmetic equivalent, the shift command. For example, the command—ishft(t,-3)—uses integer arithmetic to perform a binary shift of variable t by three digits, which is identical to the floating point divide by 8 command. Similarly, ishft (t,-4) is equivalent to dividing by 16, and so on. Therefore, to the extent that a computation involves an operation by a power of 2, integer arithmetic may improve computation speed by allowing an integer operation to be performed at the same time as a floating point operation, provided that the depth slice decomposition method involves a power of two decomposition, and as long as an appropriate coding style is used, and further provided that neither the integer nor the floating point operation requires the result of the other operation as an input parameter.

The present method thereby incorporates the following technique for interpolating traveltime data and performing seismic analysis. First, as traveltime data are input to local memory of an analysis PE, the traveltime values are multiplied by the constant oversampling factor 16 and converted to integer variable format. This multiplication is required to ensure no loss of traveltime resolution during the subsequent integer operations (t'=16t in the following). As will be understood by those skilled in the art, the magnitude of the oversampling factor will vary depending on the resolution of the traveltime data, which in turn will depend on the nature of the dataset from which the traveltimes derive. Relatively sparsely sampled seismic data may result in a smaller oversampling factor for the traveltimes, whereas relatively fine seismic data may result in a larger factor. A magnitude 16 factor is typical, but is not to be construed as limiting.

Next, the incremental time for the interpolation is determined, as follows:

$$delta=ishft\{[t'(m)-t'(e)\},-3] \tag{5}$$

Note that this term is identical to the last term in (4'), if the initial multiplication by 16 is not taken into account. Equation (5) is a one time only calculation for each pair of depth slices. Thereafter, the following coding style is employed (the following sequence represents the equivalent of three consecutive cycles of computations involving (2) and (3) above and directed to analysis points 28F, 28G, and 28H and again excludes the implicitly-required load and store operations):

$$t'(28F)=t'(28E)+\text{delta} \quad (6)$$

$$t(28F)=ishft\{t'(28F),-4\} \quad (7)$$

$$x(28F)=x(28F)+y[t(28F)] \quad (8)$$

$$t'(28G)=t'(28F)+\text{delta} \quad (9)$$

$$t(28G)=ishft\{t'(28G),-4\} \quad (10)$$

$$x(28G)=x(28G)+y[t(28G)] \quad (11)$$

$$t'(28H)=t'(28G)+\text{delta} \quad (12)$$

$$t(28H)=ishft\{t'(28H),-4\} \quad (13)$$

$$x(28H)=x(28H)+y[t(28H)] \quad (14)$$

Note that equations 6, 9, and 12 involve the calculation of integer form two-way traveltimes associated with each succeeding analysis point 28F, 28G, and 28H. Steps 7, 10, and 13 involve the shift by 16 (i.e. division by 16) required to convert the two-way traveltimes back to correctly scaled values. These correctly scaled values are in integer variable format. Steps 8, 11, and 14 are the analysis steps for the three consecutive analysis points, 28F, 28G, and 28H.

The advantage which results from equations 6–14 is that integer and floating point operations alternate, thereby enabling processor capabilities to be taken advantage of. For example, (6) and (7) are integer operations which must be initiated by consecutive clock periods. However, (8) is a floating point operation whose output is not required for (9), thus allowing (8) and (9) to both be initiated in one clock period. Similarly, (11) and (12) can be initiated simultaneously, as can (14) and the next step in the progression (not shown). This coding style thereby improves analysis PE throughput, as compared to the coding style in which floating point operations are initialed sequentially by reducing the number of clock periods which are required to perform an analysis.

The above coding style directly results from the power of two depth and traveltime slice decomposition technique disclosed in the present method. In practice, the above example would be encoded in loops within which the largely sequential coding style can be carried out. The formality of the notation in the above example is provided for explanatory convenience only, and is not to be construed as a limitation. Furthermore, it should be noted that in the above example the variables in steps 6, 7, 9, 10, 12, 13, are all integer variables, while the variables X and Y in steps 8, 11, 14 are floating point variables. This contrasts with the original coding style, in which all operations (except the sole "Int" operation), and therefore all variables, are floating point.

The above integer-oriented coding style may also be applied to interpolation from the traveltime grid to the analysis grid. Specifically, the above example demonstrated the benefits of employing the integer-oriented coding style for interpolating from traveltime slices to depth slices. However, that interpolation only results in a traveltime value at a traveltime grid point location on the depth slice. Further analysis on that depth slice will require traveltimes at the analysis grid points. Therefore, as described above, a horizontal interpolation on the depth slice will also be required. Specifically, as depicted in FIG. 13, an interpolation from traveltime grid points 33A, 33B, 33C, and 33D to analysis point 28 is required. Provided that analysis point 28 and other analysis points (not shown) subdivide the traveltime grid along the X and Y axes by powers of two, the integer-oriented coding style can also be invoked for the horizontal interpolation. As an example, for a four-to-one ratio, three analysis grid points would lie between consecutive traveltime grid points (along each axis-X and Y), and a linear interpolation multiple of 0.25 (¼) would be employed in the integer oriented coding style.

Note that interpolation will not be required for all analysis points. As noted above in traveltime field specification, a depth slice will be coincident with each traveltime slice. Furthermore, an analysis grid point will be coincident with each traveltime grid point. Therefore, no horizontal interpolation will be required for analysis points coincident with a traveltime point. And no vertical interpolation will be required for depth slices coincident with a traveltime slice. However, even where no horizontal interpolation is necessary, a vertical interpolation may be necessary, and where no vertical interpolation is necessary, a horizontal interpolation may be necessary.

The relative amount of improvement in MPP throughput which results from the above described coding style will depend on several factors, including the exact characteristics of the microprocessors being used and the manner in which the software compiler generates executable code. In addition, the relative amount of improvement will depend on the number, sequence, and speed of required load and store operations, as discussed above. The above coding style will allow a two-fold increase in MPP throughput, as compared to the floating point coding style, and, as will be understood by those skilled in the art, with some compilation and assembly language tuning by one skilled in the art, may result in additional throughput increases.

The analysis PEs next compute the aperture region for the trace (95 in FIG. 8). This computation determines which analysis points on the depth slice are within the aperture for the trace and which analysis points are outside that aperture. The result is used to set the range on loops contained in the processing routine such that those analysis points not within the aperture region are excluded from the processing loops. For some traces on some depth slices, the aperture will not contain any analysis points, in which case a null loop (i.e. no calculations to be performed for that trace on that depth slice) will result.

The trace data and the traveltime data are used to compute the contribution of the trace to the analysis result for all analysis points within the aperture (96 in FIG. 8). As indicated in FIG. 8, this is repeated for all traces in the group initially transmitted to the analysis PEs (97 in FIG. 8), and is then repeated for each succeeding group which is transmitted from the control PE to the analysis PEs (98 in FIG. 8).

The calculation of the contribution of each trace to the analysis result may optionally involve an additional interpolation. This interpolation involves the resampling of the data trace. As will be understood to those skilled in the art, the standard sampling of seismic data traces is at an interval of four milliseconds. Therefore, after the interpolation described above is completed and a traveltime has been computed for each analysis grid point on a depth slice, the calculation of the contribution of each trace to the analysis result at those grid points will generally involve selecting the amplitude of the trace data at the time most nearly corresponding to the time calculated for each analysis grid point. However, if the trace data are resampled to a finer time scale, the resampled trace data time will more closely correspond to the traveltime for the grid point, with the amplitude corresponding to the trace data time also more accurately reproducing the correct amplitude for that grid point and that trace. The result is an increase in the accuracy of the overall analysis procedure.

In the present method, therefore, as part of the processing of the trace data for the analysis points within the aperture (96 in FIG. 8), the trace data are resampled from a four millisecond interval down to a one-fourth millisecond interval. This resampling can be performed by any available interpolation procedure. For example, linear interpolation procedures are well known to those skilled in the art. Alternatively, other interpolation procedures, such as LaGrangian, spline, or other higher order methods, may also be used. It should also be noted that the trace data resampling could be performed at other earlier times in the method, or by the control PE or the host computer. However, resampling increases the data volume (by a factor of sixteen for a four millisecond to a 0.25 millisecond resampling), and, as discussed above in association with the data preprocessing aspects of the present invention, for data communication efficiency the resampling is therefore preferably performed in the analysis PE just prior to the final calculation. As will understood to those skilled in the art, the above resampling example is for demonstration purposes only, and is not to be construed as limiting.

After all trace data have been processed, each analysis PE retains the final analysis result for each analysis point on each of its assigned depth slices; those analysis results are output to disk files which are used for postprocessing procedures (99 in FIG. 8). For example, postprocessing of redundant output results from several sets of common offsets could be used to generate a final processing result.

The above method can be used in a number of different seismic processing applications. For example, the method can be used to generate seismic images using prestack Kirchhoff time or depth migration analytic routines. Kirchhoff techniques do not require direct interaction among depth slices of the image, can rely on computed traveltime arrays which may also be partitioned into depth slices, and involve input data which contribute independently to the various slices of the image. An alternate application of the present method is wave equation modeling by finite differences, where each group of consecutive depth slices in the model will generally require relatively little exchange of data with a group of neighboring depth slices. A third application of the present method involves reverse time migration by finite differences, which also involves groups of consecutive depth slices which generally require relatively little exchange of data with a group of neighboring depth slices.

Furthermore, the method can be used to perform dip moveout (DMO) corrections on seismic data. DMO is typically performed in the common offset domain to correct for reflector dip. It is generally performed prior to migration and stacking, and provides a method of preserving all dips in a seismic section. The present method can be applied to DMO analyses although, as will be apparent to one skilled in the art, the traveltime decomposition aspects of the invention may be simplified for such applications.

Finally, the invention is not merely limited to 3D analysis of 3D data. For example, analysis of a 2D slice through an analysis cube can be performed much more quickly and more cost-effectively than with prior art methods. In such applications, 3D seismic data and 3D traveltime fields will be used in the present method, as described above. However, the depth and traveltime decompositions, rather than focusing on entire slices through the analysis cube, will focus on single lines on each of those slices, with analysis PE assignments involving those lines, as will be apparent to those skilled in the art.

It should be understood that the invention is not to be unduly limited to the foregoing which has been set forth for illustrative purposes. Various modifications and alternatives will be apparent to those skilled in the art without departing from the true scope of the invention, as defined in the following claims.

What we claim is:

1. A multiple data stream method of processing seismic data, said seismic data corresponding to a subsurface region of the earth, said processing performed on a computer system having multiple processing elements, said method comprising the steps of:

a) assigning analysis tasks to at least a plurality of said processing elements, each said analysis task relating to an independent portion of said subsurface region;

b) assigning input/output tasks to at least one of said processing elements;

c) downloading precomputed traveltime fields from high speed mass storage to traveltime disk mass storage and, using said input/output processing elements, downloading said traveltime fields therefrom to said analysis processing elements;

d) downloading said seismic data from tape mass storage to data disk mass storage;

e) assigning to at least one of said processing elements the control task of downloading said seismic data from said data disk mass storage to said analysis processing elements said control processing element monitoring seismic data buffers in said analysis processing elements to optimize the downloading of said seismic data to said analysis processing elements; and f) processing said seismic data on said analysis processing elements by using said traveltime fields to carry out said analysis tasks, wherein each said analysis processing element processes said seismic data independently of each other said analysis processing element.

2. The method of claim 1, wherein said downloading of said seismic data to said analysis processing elements uses a logarithmic tree broadcast.

3. The method of claim 2, wherein two-way message passing among said analysis processing elements and said control element is used to asynchronously optimize seismic data broadcast through said tree.

4. The method of claim 1, wherein said control processing element is assigned the additional control task of the transmitting of requests to download said traveltime fields to said traveltime disk mass storage.

5. The method of claim 4, wherein said control processing element monitors traveltime field buffers in said analysis processing elements to optimize the downloading of said traveltime fields to said analysis processing elements.

6. The method of claim 1, wherein said input/output processing elements directly scatter said traveltime fields to said analysis processing elements.

7. The method of claim 6, wherein said input/output processing elements monitor traveltime field buffers in said analysis processing elements to optimize the downloading of said traveltime fields to said analysis processing elements.

8. The method of claim 7, wherein two-way message passing between said input/output processing elements and said analysis processing elements is used to asynchronously optimize said downloading of said traveltime fields to said analysis processing elements.

9. The method of 1, wherein said processing of said seismic data on said analysis processing elements further comprises the step of resampling said seismic data.

10. A multiple data stream method of processing seismic data, said seismic data corresponding to a subsurface region of the earth, said processing performed on a computer system having multiple processing elements, said method comprising the steps of:

a) assigning analysis tasks to a plurality of said processing elements, each said analysis task relating to an independent portion of said subsurface region;

b) assigning input/output tasks to as least one of said processing elements;

c) downloading precomputed traveltime fields from high speed mass storage to traveltime disk mass storage and, using said input/output processing elements, downloading said traveltime fields therefrom to said analysis processing elements;

d) downloading said seismic data from tape mass storage to data disk mass storage;

e) assigning to at least one of said processing elements the control tasks of 1) downloading said seismic data from said data disk mass storage, 2) preprocessing said downloaded seismic data, and 3) downloading said preprocessed seismic data to said analysis processing elements; and f) processing said seismic data on said analysis processing elements by using said traveltime fields, wherein each said analysis processing element processes said seismic data independently of each other said analysis processing element.

11. A multiple data stream method of processing seismic data, said seismic data corresponding to a subsurface region of the earth, said processing performed on a computer system having multiple processing elements, said method comprising the steps of:

a) assigning analysis tasks to a plurality of said processing elements, each said analysis task relating to an independent portion of said subsurface region;

b) assigning input/output tasks to at least one of said processing elements;

c) downloading precomputed traveltime fields from high speed mass storage to traveltime disk mass storage;

d) using said input/output processing elements to directly scatter said traveltime fields from said traveltime disk mass storage to said analysis processing elements, wherein two-way message passing between said input/output processing elements and said analysis processing elements is used to asynchronously optimize said downloading of said traveltime fields to said analysis processing elements;

e) downloading said seismic data from tape mass storage to data disk mass storage;

f) assigning to at least one of said processing elements the control tasks of 1) downloading said seismic data from said data disk mass storage, 2) preprocessing said downloaded seismic data, and 3) downloading said preprocessed seismic data to said analysis processing elements using a logarithmic tree broadcast, wherein two-way message passing among said analysis processing elements and said control processing element is used to asynchronously optimize said broadcast; and g) processing said seismic data on said analysis processing elements by using said traveltime fields, wherein each said analysis processing element processes said seismic data independently of each other said analysis processing element.

* * * * *